(12) United States Patent
Sevin et al.

(10) Patent No.: US 9,959,651 B2
(45) Date of Patent: May 1, 2018

(54) METHODS, DEVICES AND COMPUTER PROGRAMS FOR PROCESSING IMAGES IN A SYSTEM COMPRISING A PLURALITY OF CAMERAS

(71) Applicant: CANON KABUSHIKI KAISHA, Tokyo (JP)

(72) Inventors: Julien Sevin, Saint Aubin du Cormier (FR); Gérald Kergourlay, Chevaigne (FR)

(73) Assignee: Canon Kabushiki Kaisha, Tokyo (JP)

( * ) Notice: Subject to any disclaimer, the term of this patent is extended or adjusted under 35 U.S.C. 154(b) by 49 days.

(21) Appl. No.: 15/170,647

(22) Filed: Jun. 1, 2016

(65) Prior Publication Data

US 2016/0358032 A1 Dec. 8, 2016

(30) Foreign Application Priority Data

Jun. 4, 2015 (GB) .................................. 1509723.1

(51) Int. Cl.
| | |
|---|---|
| *G06K 9/20* | (2006.01) |
| *G06T 11/60* | (2006.01) |
| *G06T 7/00* | (2017.01) |
| *G06T 7/174* | (2017.01) |
| *G06K 9/00* | (2006.01) |
| *G06T 3/40* | (2006.01) |

(52) U.S. Cl.
CPC .......... *G06T 11/60* (2013.01); *G06K 9/00771* (2013.01); *G06T 3/4038* (2013.01); *G06T 7/174* (2017.01); *G06T 7/97* (2017.01)

(58) Field of Classification Search
CPC ....... G06T 11/60; G06T 3/4038; G06T 7/174; G06T 7/97; G06K 9/00771

USPC .......................................... 382/103, 154, 282
See application file for complete search history.

(56) References Cited

U.S. PATENT DOCUMENTS

| | | | | |
|---|---|---|---|---|
| 2003/0095183 A1* | 5/2003 | Roberts | ............ | G08B 13/19608 348/153 |
| 2012/0236168 A1 | 9/2012 | Tsutsumi | | |

FOREIGN PATENT DOCUMENTS

| | | |
|---|---|---|
| EP | 2741485 A2 | 6/2014 |
| JP | 2013223104 A | 10/2013 |

OTHER PUBLICATIONS

Combined Search and Examination Report under Sections 17 and 18(3) for GB Patent Application No. 1509723.1, dated Dec. 15, 2015.

\* cited by examiner

*Primary Examiner* — Daniel Mariam
(74) *Attorney, Agent, or Firm* — Canon USA, Inc. I.P. Division

(57) ABSTRACT

The present disclosure relates to processing images representing a real scene, the images comprising at least two images obtained from at least two sources of images, a sub-image of each of the at least two images representing an overlapping area of the real scene. A role map comprising a plurality of parts, all the points of each part of the role map being associated with a single identifier of a source of images, is generated during a training phase. To process the images, parts of the role map are selected as a function of an identifier of a considered source of images, and sub-images of an image obtained from the considered source of images are processed, the processed sub-images corresponding to the selected parts of the role map.

20 Claims, 12 Drawing Sheets

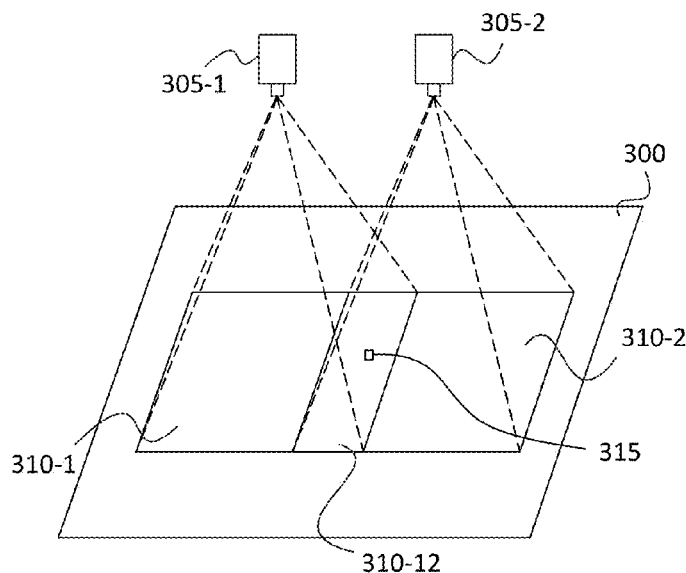
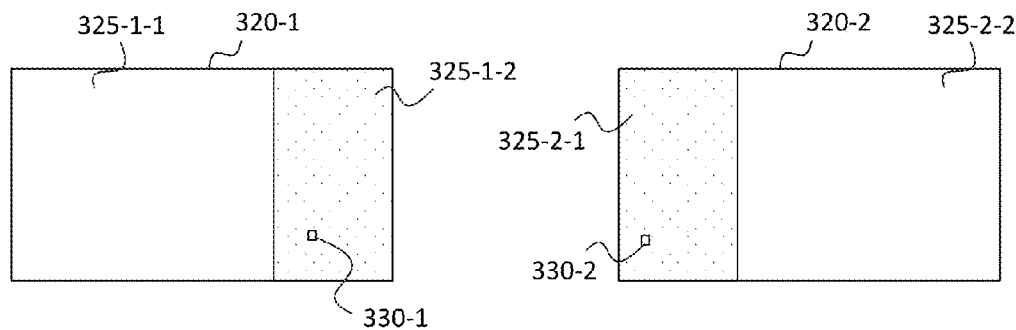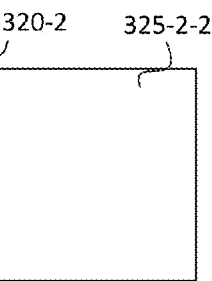
Fig. 3a
Fig. 3b          Fig. 3c
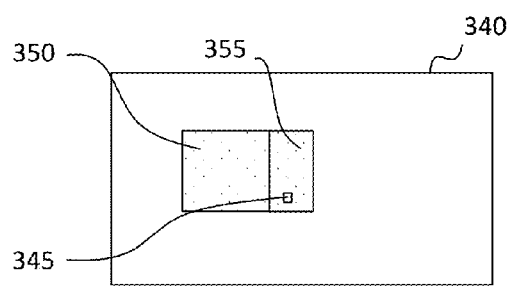
Fig. 3d

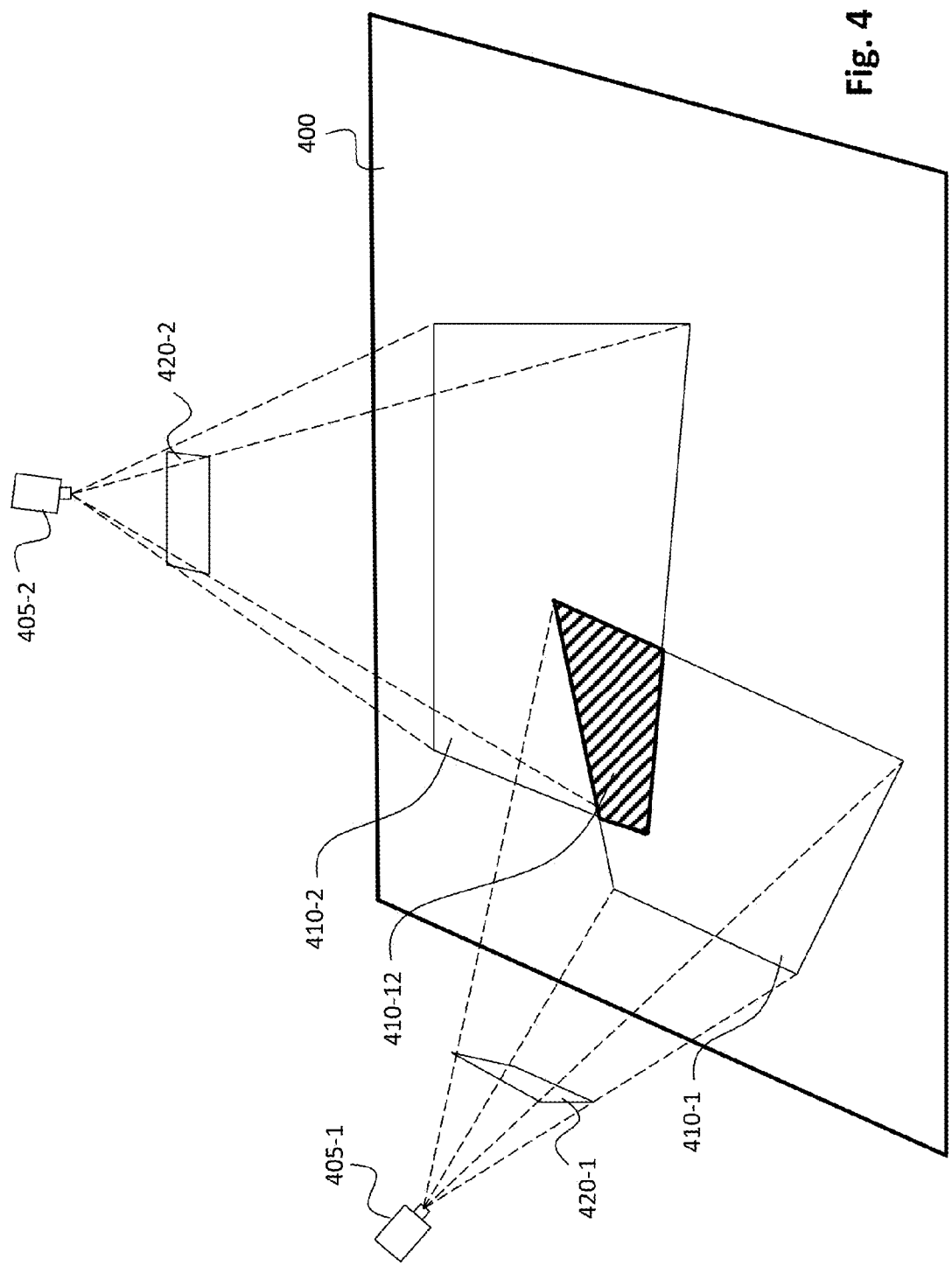

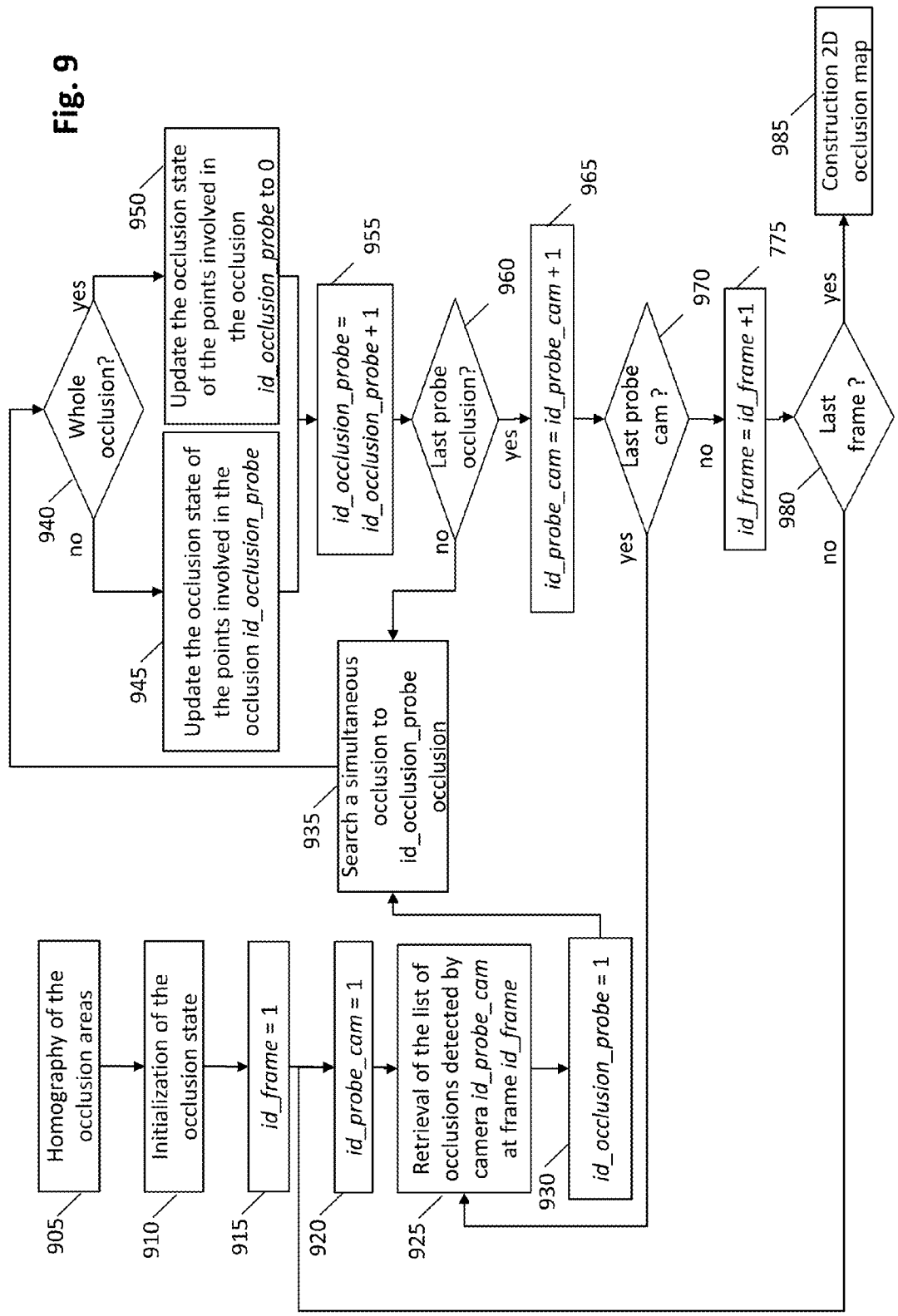

METHODS, DEVICES AND COMPUTER PROGRAMS FOR PROCESSING IMAGES IN A SYSTEM COMPRISING A PLURALITY OF CAMERAS

CROSS-REFERENCE TO RELATED APPLICATION(S)

This application claims the benefit under 35 U.S.C. § 119(a)-(d) of United Kingdom Patent Application No. 1509723.1, filed on Jun. 4, 2015, and entitled "METHODS, DEVICES AND COMPUTER PROGRAMS FOR PROCESSING IMAGES IN A SYSTEM COMPRISING A PLURALITY OF CAMERAS", which is incorporated by reference herein in its entirety.

FIELD OF THE INVENTION

The present invention relates in general to video-surveillance systems including tracking modules enabling tracking of targets, and in particular to methods, devices and computer programs for processing images in video-surveillance systems comprising a plurality of cameras having overlapping fields of view.

BACKGROUND OF THE INVENTION

Overlapping of the fields of view (FoV) of cameras in a video-surveillance system used for tracking objects, for example for tracking people in streets, makes it possible to solve occlusion problems that may occur in a scene when a tracked object is hidden by another object. Tracking algorithms taking advantage of overlapping fields of view are referred to as fusion algorithms.

More precisely, a main goal of using cameras having overlapping fields of view is to track objects by combining data from a set of overlapping cameras (overlooking at least partially the same scene, i.e., possibly with a partial overlap of their FoV) and to establish a correspondence across multiple views (track assignment).

According to a first solution, tracking of objects is based on data correspondences between images acquired from different cameras. To that end, features are extracted from images acquired by the cameras of a video-surveillance system and next, they are compared. Such features can be, for example, color histograms. Tracking of objects is determined as a function of data correspondences between images and of the relative positions of the cameras from which the images are obtained. This first solution is known as multi-sensor fusion.

According to a second solution, a tracking module is associated with each camera of the video-surveillance system, referred to as mono-camera trackers (associated with the different videos generated by the overlapping cameras), so that the objects are tracked independently in images from each camera. In a further step, the tracking data issued by each camera are merged or processed to select one tracker that is used for providing tracking data (it is considered to be the best tracker). The methods based on such a solution are referred to as multi-tracker fusion.

A tracking module may be based on the method known as tracking-by-detection method. According to the latter, the output of a detector is used to generate target hypotheses in each image of a sequence of images, which then have to be transitively linked to form paths with consistent identity labels. It can therefore be formulated as a data association problem, which generally relies on affinity models between detections in successive images based on motion constraints and intrinsic object descriptors such as color.

It is to be noted that there exist different ways of implementing a tracking algorithm and more generally a Video Content Analysis (VCA) algorithm on which is typically based a tracking algorithm.

In a centralized implementation, a VCA algorithm is implemented in a server as a part of a video management system server of a video surveillance system or in connexion with that video management system server. According to this solution, the server implementing the VCA algorithm generates all video content analytics from the videos of all the cameras of the system. As a consequence, a high computing power and a huge amount of memory are required within the server. In addition, further hardware costs are often required to manage all the cameras (for instance in a large scale video-surveillance system). This problem gets bigger as a function of the number of cameras in the video-surveillance system.

On the contrary, in a distributed implementation, VCA algorithms are implemented within the cameras, each camera being in charge of generating the video content analytics for the images acquired by that camera. However, since cameras generally have limited computing resources that are not adapted to handle complex VCA algorithms, this may lead to low performance in terms of efficiency. In other words, only simple tracking algorithms can generally be implemented in cameras, which does not allow high performance to be attained.

As a consequence, whether the tracking algorithms are distributed or centralized, their implementation costs in terms of complexity (computation time and required amount of memory) are a real issue.

Consequently, there is a need for reducing the implementation costs of tracking algorithm while maintaining their efficiency.

SUMMARY OF THE INVENTION

The present disclosure has been devised to address one or more of the foregoing concerns.

In this context, there is provided a solution enabling spatial-based interactions between tracking modules of overlapping cameras in order to select only one module that is to be used for tracking purpose.

According to a first object of the disclosure, there is provided a method for optimizing processing of at least two images obtained from at least two sources of images, a sub-image of each of the at least two images representing an overlapping area of a real scene, the method comprising: generating a map representing the overlapping area of the real scene; partitioning the generated map into a plurality of sub-areas as a function of an occlusion criterion determined for points of the overlapping area; associating an identifier of a source of images with points of the generated map, the associating step being based on the occlusion criterion or on a detection score depending on the sub-areas; and generating a role map based on the generated map and on the associated identifiers, the role map comprising a plurality of parts, all the points of each part of the role map being associated with a single identifier of a source of images so that only one of the at least two sources of images is to be selected to process a representation of a portion of the overlapping area.

Therefore, the method of the disclosure makes it possible to predetermine sources of images to be used as a function of locations of features to be analyzed, in real scenes, for example of objects to track. As a consequence, the resources to be used for processing images obtained from different sources of images can be optimized.

In an embodiment, an identifier of a considered source of images is associated with a considered point of a sub-area of the overlapping area if no occlusion is detected for the considered point in an image obtained from the considered source of images. Therefore, a source of images can be easily and efficiently assigned to points of sub-areas of the overlapping area.

In an embodiment, an identifier of a source of images is associated with a considered point of a sub-area of the overlapping area as a function of a detection score criterion associated with each source of images of a set of sources of images if no occlusion is detected for the considered point in an image obtained from each source of images of the set of sources of images.

In an embodiment, an identifier of a source of images is associated with a considered point of a sub-area of the overlapping area as a function of a detection score criterion if an occlusion is detected for the considered point in an image obtained from each of the sources of images providing images comprising a sub-image representing the overlapping area of the real scene.

In an embodiment, the method further comprises preliminary steps of determining occlusion criterions, an occlusion criterion being associated with a point of the overlapping area and with a source of images.

In an embodiment, a preliminary step of determining an occlusion criterion is carried out for each point of the overlapping area.

In an embodiment, the method further comprises a step of computing detection scores, a detection score being associated with a point of the overlapping area and with a source of images.

In an embodiment, detection scores are selectively computed based on occlusion criterions.

In an embodiment, the detection scores are computed on the basis of images that are different from images used to determine the occlusion criterions.

A second aspect of the disclosure provides a method for processing images representing a real scene, the images comprising at least two images obtained from at least two sources of images, a sub-image of each of the at least two images representing an overlapping area of the real scene, the method being implemented in association with each of the sources of images and comprising: obtaining a role map comprising a plurality of parts, all the points of each part of the role map being associated with a single identifier of a source of images; selecting parts of the role map as a function of an identifier of the considered source of images; and processing sub-images of an image obtained by the considered source of images, the processed sub-images corresponding to the selected parts of the role map.

Therefore, resources to be used for processing images obtained from different sources of images can be optimized by selecting predetermined sources of images as a function of locations of features to be analyzed, in real scenes, for example of objects to track.

In an embodiment, the method further comprises a step of projecting the selected parts of the role map into a reference frame associated with the images obtained by the considered source of images.

In an embodiment, the method further comprises a step of extracting the sub-images to be processed, the extracted sub-images corresponding to the projected parts of the role map.

There is also provided a method for processing at least two images obtained from at least two sources of images, a sub-image of each of the at least two images representing an overlapping area of a real scene, the method comprising: generating a map representing the overlapping area of the real scene; partitioning the generated map into a plurality of sub-areas as a function of an occlusion criterion determined for points of the generated map; associating a single identifier of a source of images with points of the generated map, the associating step being based on the occlusion criterion or on a detection score, depending on the plurality of sub-areas; generating a role map based on the generated map and on the associated identifiers, the role map comprising a plurality of parts, all the points of each part of the role map being associated with a single identifier of a source of images so that only one of the at least two sources of images is to be selected to process a representation of a portion of the overlapping area, all points of each part corresponding to a set of adjacent points of the generated map associated with a same associated identifier; selecting parts of the role map as a function of an identifier of the considered source of images; and processing sub-images of an image obtained by the considered source of images, the processed sub-images corresponding to the selected parts of the role map.

There is also provided a method for optimizing processing of at least two images obtained from at least two cameras, the method comprising: generating an overlapping area of a real scene among at least two cameras; determining an occlusion criterion in the overlapping area; and generating a role map based on the occlusion criterion so that one of the at least two cameras is to be selected to process a representation of a portion of the overlapping area.

A third aspect of the disclosure provides a device for optimizing processing of at least two images obtained from at least two sources of images, a sub-image of each of the at least two images representing an overlapping area of a real scene, the device comprising a processor configured for carrying out the steps of: generating a map representing the overlapping area of the real scene; partitioning the generated map into a plurality of sub-areas as a function of an occlusion criterion determined for points of the overlapping area; associating an identifier of a source of images with points of the generated map, the associating step being based on the occlusion criterion or on a detection score depending on the sub-areas; and generating a role map based on the generated map and on the associated identifiers, the role map comprising a plurality of parts, all the points of each part of the role map being associated with a single identifier of a source of images so that only one of the at least two sources of images is to be selected to process a representation of a portion of the overlapping area.

Therefore, at least one device of the disclosure makes it possible to predetermine sources of images to be used as a function of locations of features to be analyzed, in real scenes, for example of objects to track. As a consequence, the resources to be used for processing images obtained from different sources of images can be optimized.

In an embodiment, the processor is further configured so that an identifier of a considered source of images is associated with a considered point of a sub-area of the overlapping area if no occlusion is detected for the considered point in an image obtained from the considered source of images.

In an embodiment, the processor is further configured so that an identifier of a source of images is associated with a considered point of a sub-area of the overlapping area as a function of a detection score criterion associated with each source of images of a set of sources of images if no occlusion is detected for the considered point in an image obtained from each source of images of the set of sources of images.

In an embodiment, the processor is further configured so that an identifier of a source of images is associated with a considered point of a sub-area of the overlapping area as a function of a detection score criterion if an occlusion is detected for the considered point in an image obtained from each of the sources of images providing images comprising a sub-image representing the overlapping area of the real scene.

In an embodiment, the processor is further configured to carry out preliminary steps of determining occlusion criterions, an occlusion criterion being associated with a point of the overlapping area and with a source of images.

In an embodiment, the processor is further configured so that a preliminary step of determining an occlusion criterion is carried out for each point of the overlapping area.

In an embodiment, the processor is further configured to carry out a step of computing detection scores, a detection score being associated with a point of the overlapping area and with a source of images.

In an embodiment, the processor is further configured so that detection scores are selectively computed based on occlusion criterions.

In an embodiment, the processor is further configured so that the detection scores are computed on the basis of images that are different from images used to determine the occlusion states.

There is also provided a device for optimizing processing of at least two images obtained from at least two cameras, the device comprising a processor configured for carrying out the steps of: generating an overlapping area of a real scene among at least two cameras; determining an occlusion criterion in the overlapping area; and generating a role map based on the occlusion criterion so that one of the at least two cameras is to be selected to process a representation of a portion of the overlapping area.

A fourth aspect of the disclosure provides a device for processing images representing a real scene, the images comprising at least two images obtained from at least two sources of images, a sub-image of each of the at least two images representing an overlapping area of the real scene, the device being associated with one of the sources of images and comprising a processor configured for carrying out the steps of: obtaining a role map comprising a plurality of parts, all the points of each part of the role map being associated with a single identifier of a source of images; selecting parts of the role map as a function of an identifier of the considered source of images; and processing sub-images of an image obtained by the considered source of images, the processed sub-images corresponding to the selected parts of the role map.

Therefore, resources to be used for processing images obtained from different sources of images can be optimized by selecting predetermined sources of images as a function of locations of features to be analyzed, in real scenes, for example of objects to track.

In an embodiment, the processor is further configured to carry out a step of projecting the selected parts of the role map into a reference frame associated with the images obtained by the considered source of images.

In an embodiment, the processor is further configured to carry out a step of extracting the sub-images to be processed, the extracted sub-images corresponding to the projected parts of the role map.

Since the present invention can be implemented in software, the present invention can be embodied as computer readable code for provision to a programmable apparatus on any suitable carrier medium, and in particular a suitable tangible carrier medium or suitable transient carrier medium. A tangible carrier medium may comprise a storage medium such as a floppy disk, a CD-ROM, a hard disk drive, a magnetic tape device or a solid state memory device and the like (e.g., other non-transitory media). A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the disclosure will now be described, by way of example only, and with reference to the following drawings in which:

FIG. 3, comprising FIGS. 3a to 3d, illustrates an example of acquisition of images of a real scene using two different cameras that are located directly above the real scene and of which the fields of view are partially overlapping;

FIG. 4 illustrates an example of acquisition of images of a real scene using two different cameras that are located on upper side of the real scene and of which the fields of view are partially overlapping;

FIG. 8, comprising

FIG. 9 is a flowchart illustrating steps for generating 2D occlusion maps as described by reference to FIG. 7;

DETAILED DESCRIPTION OF EMBODIMENTS OF THE INVENTION

Figure 1:
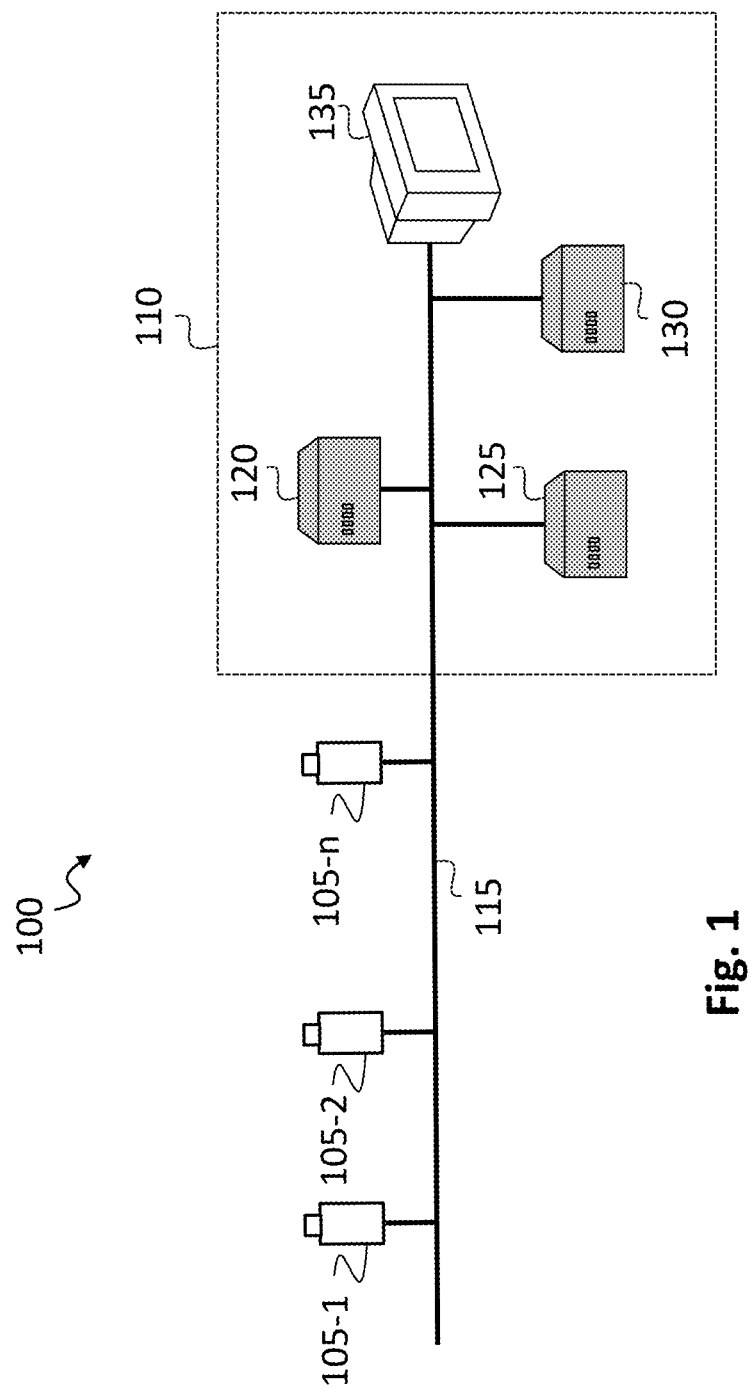
FIG. 1 illustrates a typical example of a simplified video-surveillance system wherein embodiments of the disclosure can be implemented.

FIG. 1 illustrates a typical example of a simplified video-surveillance system wherein embodiments of the disclosure can be implemented.

As illustrated, the simplified video-surveillance system 100 comprises a set of n video-surveillance cameras referenced 105-1 to 105-*n* (generically referenced 105). Each of these cameras 105 is configured to provide a sequence of images to the video-surveillance center 110 and/or to provide data to the video-surveillance center 110, for example tracking data. The images and/or data are sent from the cameras to the video-surveillance center via a communication network 115.

The set of cameras 105 can be composed of several types of cameras such as digital internet protocol (IP) video cameras, analog video cameras, or a combination thereof. According to a particular embodiment each IP camera encodes the corresponding video stream and transmits the encoded video stream to the video-surveillance center 110 via the communication network 115. Still according to a particular embodiment, each of the analog cameras is associated with a conversion module that converts an analog video stream to a digital video stream, encodes the digital video stream and transmits the encoded video stream to the video-surveillance center 110 via the communication network 115.

For the sake of illustration, the video-surveillance center 110 comprises a Video Manager Server (VMS) 120 for managing the whole system (e.g. configuration, video routing, displaying), a storage server 125 that stores videos received from cameras 105, a video analytics server 130 which implements a Video Content Analysis algorithm, and a display 135 that can be used to view videos received from cameras 105.

As illustrated, the communication network 115 connects all these elements of the video-surveillance system 100, each of these elements comprising at least one communication module, either wired or wireless, to transmit data to and/or receive data from another element via the communication network.

Figure 2:
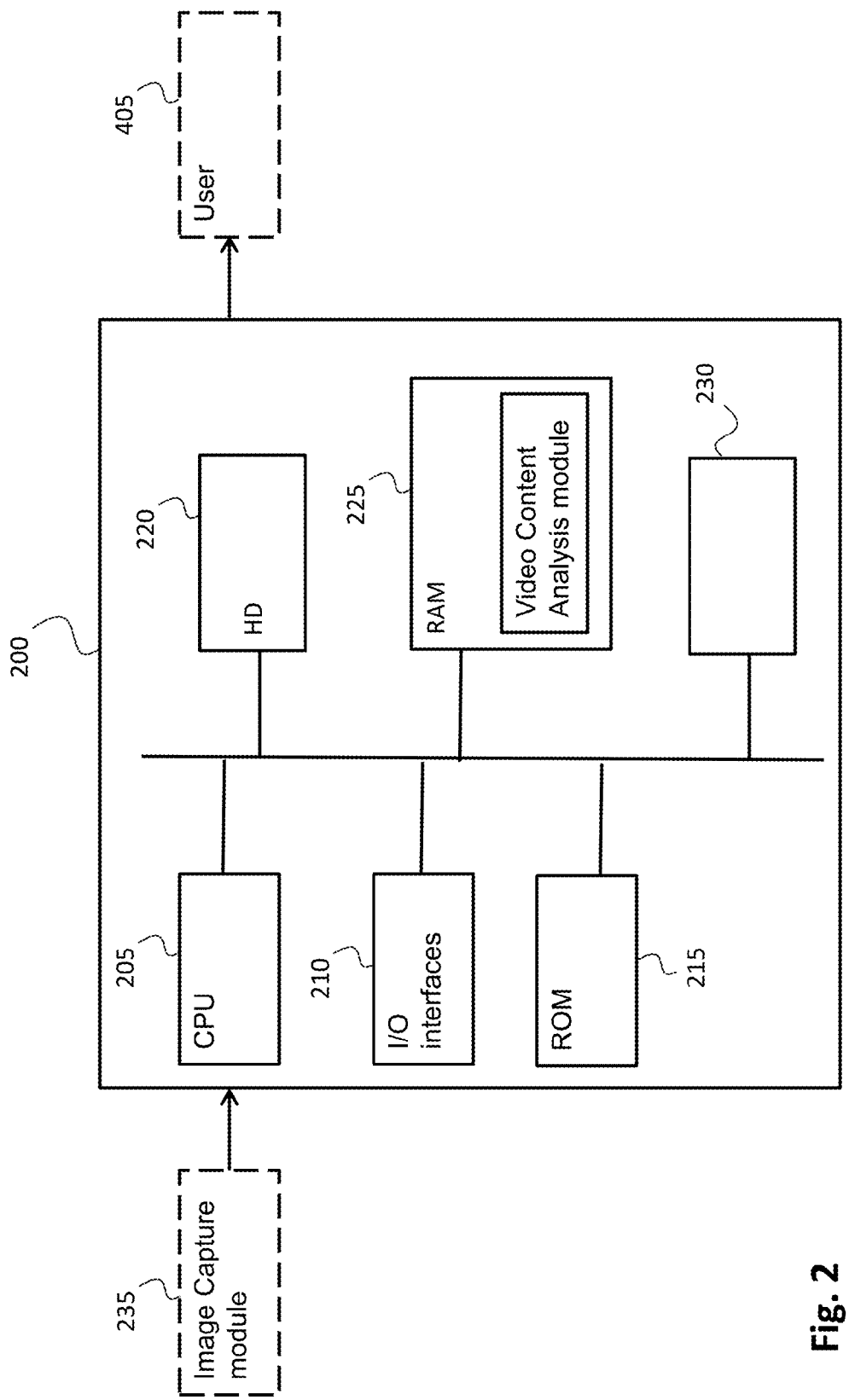
FIG. 2 is a block diagram illustrating an example of architecture for a computing device wherein embodiments of the disclosure can be implemented.

FIG. 2 is a block diagram illustrating an example of architecture for a computing device 200 wherein embodiments of the disclosure can be implemented. Computing device may be part of a video-surveillance center or may be part of a camera.

As illustrated, the computing device 200 comprises a communication bus connected to:
- a central processing unit (CPU) 205, such as a microprocessor;
- an input/output (I/O) interface module 210 for receiving data from and/or for sending data to external devices such as a video source or a display;
- a read only memory (ROM) 215 for storing computer programs, in particular computer programs for implementing embodiments of the disclosure;
- a hard disk (HD) 220;
- a random access memory (RAM) 225 for storing executable instructions (executable code), in particular instructions carrying out steps according to embodiments of the disclosure during execution as well as registers, in particular registers adapted to record variables and parameters used to implement embodiments of the disclosure. In particular, RAM 225 may store instructions for carrying out object tracking, for example instructions of a Video Content Analysis algorithm; and
- a communication module 230 that is typically connected to a communication network over which digital data, in particular processed data or data to be processed, are transmitted or received.

For the sake of illustration, 2D role maps (as described herinafter by reference to FIG. 7) can be stored in the read only memory 215 or in the hard disk 220. Similarly, the read only memory 215 or the hard disk 220 can store information on the position of one or several cameras as well as fields of view of this or these cameras.

Before being loaded into RAM 225 to be executed, an executable code is preferably stored in read only memory 215. Alternatively, it can be stored in the hard disk 220 or in a removable digital medium (not represented) such as a memory key, for example a memory key conforming to the USB (Universal Serial Bus) standard.

The central processing unit 205 is adapted to control and direct the execution of the instructions or portions of executable code of the program or programs according to embodiments of the disclosure, which instructions are stored in one of the aforementioned storage means. After powering on, the CPU 205 is capable of executing instructions from main RAM memory 225 relating to a software application after those instructions have been loaded from the ROM 215 or the hard-disk 220 for example.

As illustrated, the computing device 200 may be connected to an image capture module 235, for example one or several cameras that provide sequences of images to the computing device 200, and to a user interface 240 which receives and displays data sent by computing device 200. Displayed data may correspond to results of a tracking algorithm according to embodiments of the disclosure.

FIG. 3, comprising FIGS. 3*a* to 3*d*, illustrates an example of acquisition of images of a real scene 300 using two different cameras 305-1 and 305-2 that are located directly above the real scene and of which the fields of view are partially overlapping.

As illustrated in FIG. 3*a*, cameras 305-1 and 305-2 are configured to acquire sequences of images representing the sub-scene 310-1 and 310-2 of the scene 300, respectively, as a function of the location of the cameras and of their fields of view. Since the fields of view of cameras 305-1 and 305-2 are partially overlapping, there exists a sub-scene of the scene 300 that is represented on both sequences of images acquired by cameras 305-1 and 305-2. This overlapping sub-scene, denoted 310-12, is determined by the overlapping fields of view of cameras 305-1 and 305-2.

As a consequence, the objects that are present in the sub-scene 310-12, for example the objet 315, can be tracked by each of the cameras 305-1 and 305-2.

Here it is considered that the spatial relationships between the fields of view of the cameras are predetermined. Such relationships may consist in determining each of the sub-scenes of which a representation is acquired by two or more cameras. Such a step of determination can be done during a set-up of the system. For the sake of illustration, such a determination step can be done by analysing the presence/absence of an object in an image acquired by each of the cameras, for example the presence/absence of a person, moving in the scene. Such a determination step is well-known in the art.

FIGS. 3*b* and 3*c* represent images 320-1 and 320-2 acquired by cameras 305-1 and 305-2, respectively, at the same time. Accordingly, images 320-1 and 320-2 correspond to sub-scenes 310-1 and 310-2, respectively, represented in FIG. 3*a*.

As illustrated, each of images 320-1 and 320-2 is divided into two sub-images that represent sub-scenes viewed by a single camera and sub-scenes viewed by two or more cameras. More precisely, image 320-1 is divided into sub-images 325-1-1 and 325-1-2 while image 320-2 is divided into sub-images 325-2-1 and 325-2-2, wherein sub-image 325-1-1 represents a part of sub-scene 310-1 that is viewed only by camera 305-1, sub-image 325-2-2 represents a part of sub-scene 310-2 that is viewed only by camera 305-2, and sub-images 325-1-2 and 325-2-1 (being similar) represent the part of sub-scenes 310-1 and 310-2 that is viewed by both camera 305-1 and 305-2.

Sub-images 325-1-1 and 325-2-2 are referred to as non-overlapping sub-images and sub-images 325-1-2 and 325-2-1 are referred to as overlapping sub-images.

Since it is assumed that the cameras of the video-surveillance system are static and that their fields of view do not change, division of images into sub-images do not change over time. Such division of images acquired from the cameras of the video-surveillance system into sub-images is advantageously predetermined, for example during set-up of the cameras. Methods for doing such division are known in the art.

According to particular embodiments, a virtual image of the scene may be created from information obtained from the images acquired by each camera of the video-surveillance system. It may comprise a representation of each object to be tracked. Such a virtual image is based on a framework, also referred to as a ground plane or a 2D map, that represents the spatial organization of the cameras within the scene.

The virtual image can be obtained by projecting the representations of the objects to be tracked, as recognized in the images acquired by each camera of the video-surveillance system, onto the 2D map.

Such projection may be based, for each camera of the video-surveillance system, on a transformation of the homographic type between the images obtained from that camera and the ground of the real scene.

By projecting the boundaries of the images acquired by each camera on the ground of the real scene, one can obtain the ground plane or 2D map that provides the spatial organization of the cameras within the scene, providing a common plan of reference for all the cameras.

The projection parameters use calibration parameters of each camera. It is either predetermined or trained offline. Several standard solutions exist for determining these parameters.

FIG. 3d illustrates an example of a virtual image 340 created from information obtained from the images acquired by each camera of the video-surveillance system, in particular from images 320-1 and 320-2 acquired by cameras 305-1 and 305-2, respectively.

As mentioned above, virtual image 340 is created by projecting information associated with representations of tracked objects in an acquired image into the 2D map. Accordingly, if a representation of a tracked object is identified within image 320-1 obtained from camera 305-1, it is projected into the virtual image according to a first transformation. Similarly, if a representation of a tracked object is identified within image 320-2 obtained from camera 305-2, it is projected into the virtual image according to a second transformation.

For the sake of illustration, the projection into virtual image 340 of representation 330-1 of object 315 identified in image 320-1 and of representation 330-2 of the same object into image 320-2 leads to representation 345.

As set forth hereinabove, projecting the boundaries of the acquired images and of their sub-images according to the projection parameters enables the identification of the areas of the scene wherein each camera of the video-surveillance system makes it possible to track an object.

For example, projection of sub-image 325-1-1 into the virtual image 340 leads to area 350. Likewise, projection of sub-images 325-1-2 and 325-2-1 into the virtual image 340 leads to area 355. Therefore, camera 305-1 is to be used to track an object located in the part of the scene corresponding to area 350 and camera 305-1 or camera 305-2 can be used to track an object located in the part of the scene corresponding to area 355. The areas of the virtual image corresponding to projection of overlapping sub-images are referred to as 2D projected overlapping areas or overlapping areas.

According to particular embodiments, the points in the virtual image and/or in the ground plane (or 2D map) are expressed by using 2D world coordinates, that is to say coordinates expressed in a reference frame associated with the scene. Advantageously, each point of the 2D map corresponds to a projected pixel of an image acquired by a camera of the video-surveillance system.

FIG. 4 illustrates an example of acquisition of images of a real scene 400 using two different cameras 405-1 and 405-2 that are located on upper side of the real scene and which fields of view are partially overlapping.

The video-surveillance system illustrated in FIG. 4 is similar to the one described by reference to FIG. 3, except that the poses of the cameras are different from the poses of the cameras of the system described by reference to FIG. 3.

As illustrated, cameras 405-1 and 405-2 are configured to acquire sequences of images representing the sub-scene 410-1 and 410-2 of the scene 400, respectively, as a function of the location of the cameras and of their fields of view. Since the fields of view of cameras 405-1 and 405-2 are partially overlapping, there exists a sub-scene of the scene 400 that is represented on both sequences of images acquired by cameras 405-1 and 405-2. This overlapping sub-scene, denoted 410-12, is determined by the overlapping fields of view of cameras 405-1 and 405-2.

Again, it is considered that the spatial relationships between the fields of view of the cameras, that may consist in determining each of the sub-scenes that is acquired by two or more cameras, are predetermined.

Images 420-1 and 420-2 are acquired by cameras 405-1 and 405-2, respectively, at the same time. They correspond to sub-scenes 410-1 and 410-2, respectively.

Each of images 420-1 and 420-2 may be divided into two sub-images that represent sub-scenes viewed by a single camera (non-overlapping sub-images) and sub-scenes viewed by two or more cameras (overlapping sub-images).

Since it is assumed that the cameras of the video-surveillance system are static and that their fields of view do not change, division of images into sub-images do not change over time. Such division of images acquired from the cameras of the video-surveillance system into sub-images is advantageously predetermined, for example during set-up of the cameras, according to a known method.

The images acquired by each camera of the video-surveillance system can be used to create a virtual image of the scene that comprises a representation of each object to be tracked. It can be obtained by projection using transformations of the homographical type between the obtained images and the virtual image. The projection parameters use calibration parameters of each camera.

Again, projection of the boundaries of the acquired images and of their sub-images in a virtual image enables creating of a ground plane or 2D map identifying the areas of the scene wherein each camera of the video-surveillance system makes it possible to track an object.

It is to be noted that projections of the images acquired by the cameras are different than projections described by reference to FIG. 3, even if they are still advantageously based on transformations of the homographic type, since the poses of the cameras are different than the poses of the cameras of the system described by reference to FIG. 3.

Figure 5:
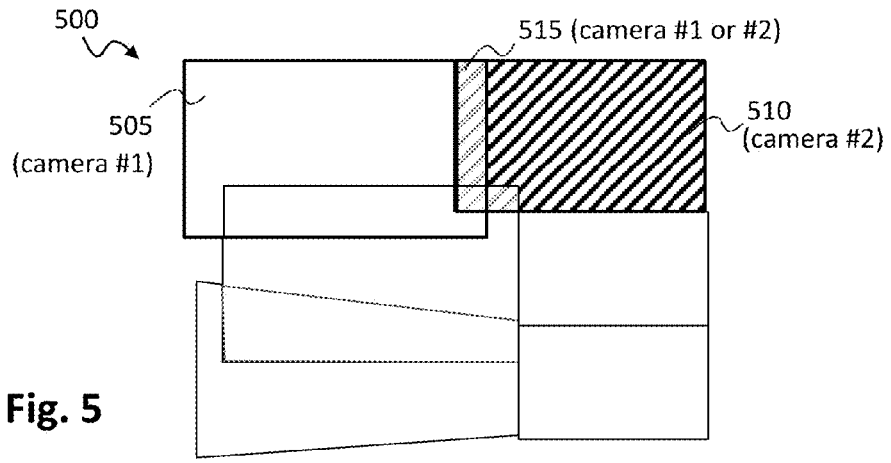
FIG. 5 represents an example of a 2D map of a real scene.

FIG. 5 represents an example of a 2D map of a real scene. As represented, 2D map 500 is divided into areas. Each area is associated with an identifier of the camera that is to be used to obtain a representation of that area or with a plurality of camera identifiers (when a representation of that area may be obtained by any one of a plurality of cameras).

For the sake of illustration, a representation of area 505 can be obtained via camera #1, a representation of area 510 can be obtained via camera #2, and a representation of area 515 can be obtained either via camera #1 or via camera #2. The areas of which a representation can be obtained via a plurality of cameras are the overlapping areas.

2D map 500 may be obtained by projecting the boundaries of images acquired by the camera of the video-surveillance system. The points 2D map are preferably expressed by using 2D world coordinates, that is to say coordinates expressed in a reference frame associated with the scene.

Figure 6:
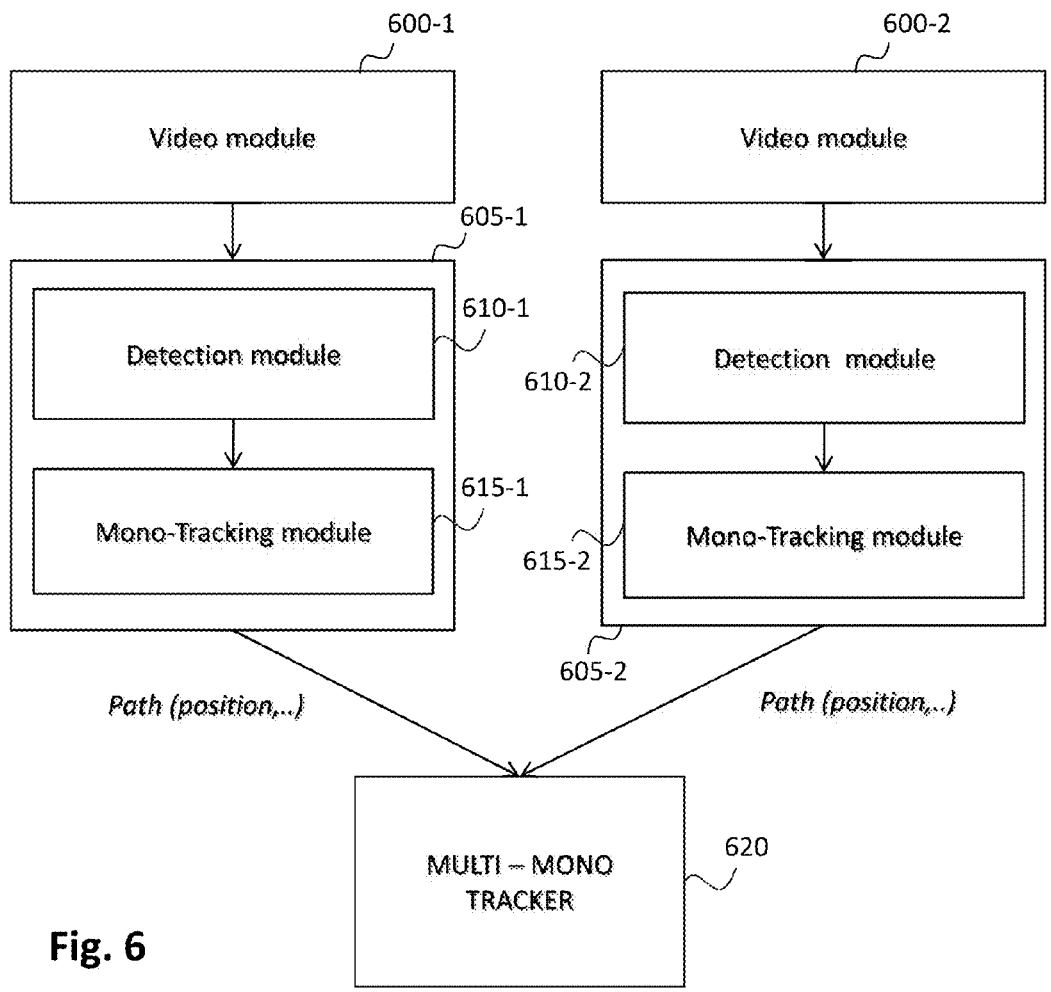
FIG. 6 is a schematic block diagram of a standard multi-tracker fusion system enabling data processed by mono-camera trackers to be combined.

FIG. 6 is a schematic block diagram of a standard multi-tracker fusion system enabling the combining of data processed by mono-camera trackers.

For the sake of illustration, the video-surveillance system comprises two cameras. However, it should be understood that the system may comprise more than two cameras.

As illustrated, a module comprising a detector module and a mono-tracker module is associated with a video module. For example, module 605-1 comprising detection module 610-1 and mono-camera tracking module 615-1 is associated with video module 600-1 and module 605-2 comprising detection module 610-2 and mono-camera tracking module 615-2 is associated with video module 600-2.

A main object of video modules 600-1 and 600-2 is to receive sequences of images (or videos) that are typically provided by a local video sensor or by a remote device.

According to particular embodiments, video modules 600-1 and 600-2 are embedded within cameras along with modules 605-1 and 605-2 (video module 600-1 and module 605-1 being embedded in a first camera and video module 600-2 and module 605-2 being embedded in a second camera). Alternatively, video modules 600-1 and 600-2 as well modules 605-1 and 605-2 belong to a remote device, typically a remote server.

According to the given example, modules 605-1 and 605-2 are tracking modules based on a tracking-by-detection algorithm. Each of these modules comprises a standard detection module (610-1 and 610-2) and a standard mono-camera tracking module (615-1 and 615-2).

Detection modules 610-1 and 610-2 may deliver bounding boxes (e.g. x-coordinate, y-coordinate, width, and height) and a corresponding detection score representing a level of confidence associated with each detected object (or person) in each image.

The results obtained by the detection modules are used by mono-camera tracking modules 615-1 and 615-2 in order to generate paths with consistent identity labels by relying on object detection in successive images. As mentioned above, mono-camera tracking modules 615-1 and 615-2 can be implemented either in cameras (e.g. camera 305-1 in FIG. 3 or camera 405-1 in FIG. 4) or in servers. In this latter case, it can be either directly included in a video manager server (e.g. VMS 120 in FIG. 1) by hosting dedicated software or in a dedicated server (e.g. server 130 in FIG. 1) as software, hardware, or a combination thereof.

In turn, the paths determined in mono-camera tracking modules 615-1 and 615-2 are fed into tracking module 620 to be combined in order to perform a persistent tracking, that is to say to track targets over several cameras and to correct errors of the individual mono-camera tracking modules. Indeed, an error that is generated by a mono-camera tracking module such as a switch of identity between two targets due to an occlusion can be recovered by another tracking module.

Tracking module 620 generates a path for each target based on the images acquired by the cameras of the video-surveillance system.

Tracking module 620 can be implemented either in a dedicated camera (e.g. camera 305-1 in FIG. 3 or camera 405-1 in FIG. 4) that is referred to as a central camera in that case, or in a server (e.g. VMS 120 or server 130 in FIG. 1). When tracking module 620 is implemented within a camera, a dedicated protocol between the central camera and the others is advantageously implemented so that all cameras (except the central one) send the results obtained by the associated mono-camera tracking module to the central camera.

Figure 7:
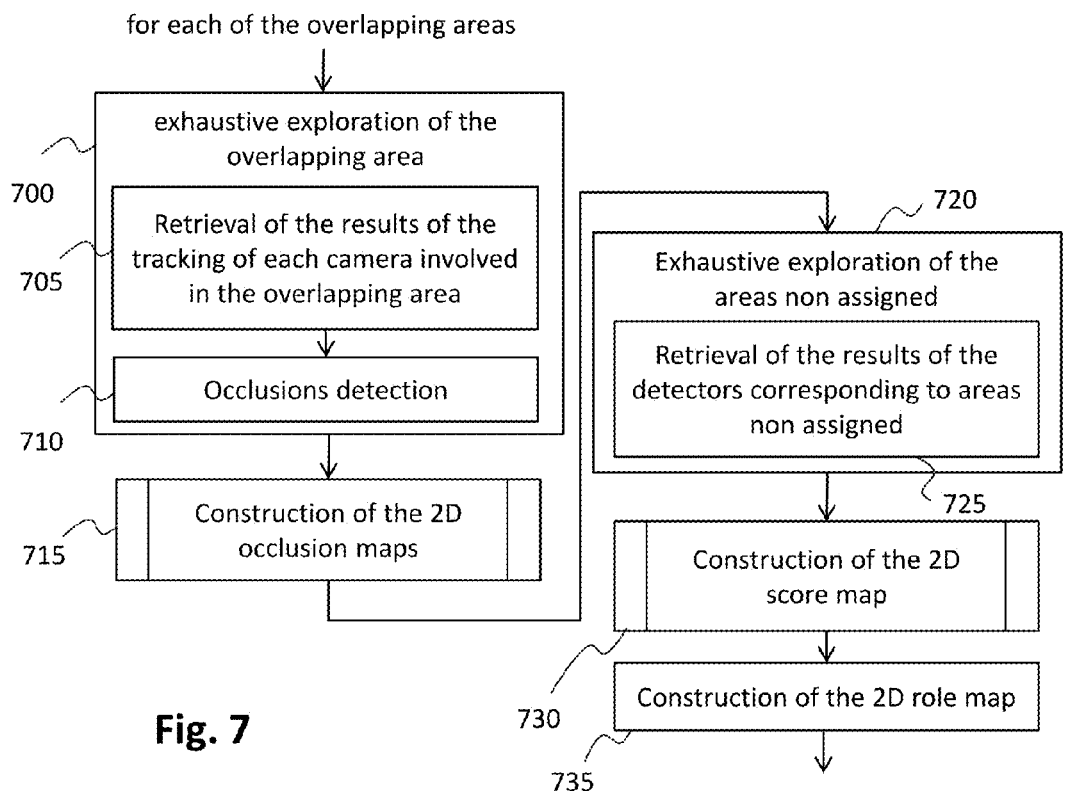
FIG. 7 is a flowchart illustrating steps of a method for generating 2D role maps that determine a role for each camera of a video-surveillance system as a function of a location, in a real scene, of an object to be tracked.

FIG. 7 is a flowchart illustrating steps of a method for generating 2D role maps that determine a role for each camera of a video-surveillance system as a function of a location, in a real scene, of an object to be tracked.

The steps illustrated in FIG. 7 are typically carried out during a phase of training, for example during the initialization of the video-surveillance system, before the operational phase.

According to particular embodiments, a role map is generated for each overlapping area of the video-surveillance system, obtained by projecting overlapping sub-images. It aims at determining which tracking modules (a tracking module is associated with each video source or each camera of the system) must be used to track a given target which is located in the overlapping area. In other words, a role map associates a tracking module identifier or a camera identifier with a location in the real scene.

Alternatively, a role map may be generated for the whole 2D map.

To that end, the overlapping areas are partitioned into overlapping sub-areas so that only one tracking module is selected for each overlapping sub-areas (the selected tracking module being the one providing the best efficiency). Accordingly, each location of a real scene is assigned to a single tracking module (or camera). As a consequence, each tracking module does not need to process the full images acquired by the associated camera but only the sub-images corresponding to the assigned sub-areas. In other words, each tracking module does not process the whole image (in particular the whole overlapping sub-images) but only the parts it is in charge of. Therefore, it is not necessary to send a whole image to a given tracking module but only the selected sub-images defined in the role map.

The overlapping areas to which the steps illustrated in FIG. 6 are applied are predetermined. As mentioned previously, such determination may be done by tracking someone moving in the scene and identifying the sub-images wherein the person is seen by several cameras. The same may be done with any object such as a vehicle or an unmanned vehicle.

As illustrated with reference 700, a first exhaustive exploration of the considered overlapping area is performed, during a first phase of a training period, using all the cameras that acquire images comprising representation of the considered overlapping area. A main object of such an exhaustive exploration during the training period is to identify an occlusion for each of the locations of the overlapping area (or for each set of locations of the overlapping area, representative of particular features of the real scene).

In practice, this exhaustive exploration can be carried out with the help of two persons (or two moving objects), each one moving and crossing in the considered overlapping area. It is to be noted that several algorithms exist in the art to cover all the points of a given area, either in a deterministic or in a random way (for example a random walk based on the Monte Carlo method).

For the sake of illustration, a basic deterministic algorithm consists in asking to a first person to stay at a given location and in asking a second person to cross all the points of the considered overlapping area. After the second person has crossed all the points of the considered overlapping area, it is asked of the first person to move to another given point of that area. Next, the second person crosses again all the points of the considered overlapping area. The process is repeated until the first person crosses all the points of the considered overlapping area.

As mentioned above, all the cameras that acquire images comprising representation of the considered overlapping area are used. The tracking modules associated with these cameras are also used.

The results of these tracking modules are obtained at step 705.

These results typically consist of a set of data, the data comprising, for each tracked person or object, an identifier ID, and a path (which is typically a set of temporal bounding boxes $BB_{i,t}$, i.e. a set of bounding boxes, each associated with the person or object i and an image index t).

Next, occlusions, if any, are detected at step 710.

According to particular embodiments, an occlusion is detected when two bounding boxes of two tracked persons and/or objects are overlapping at the same time.

Preferably, an overlap ratio is computed each time two bounding boxes of the two tracked persons overlap. This overlap ratio may represent the ratio between the area (in pixels) of the intersection of the two bounding boxes and the area (in pixels) of the smaller bounding box. If this ratio is higher than a given threshold (for example 50%), an occlusion is detected, otherwise it is ignored.

The analysis carried out during step 710 is made for each camera (among all the cameras that acquire images comprising representation of the considered overlapping area) and for each image acquired by these cameras.

Parameters associated with each detected occlusion are stored. These parameters may comprise an occlusion identifier (e.g. a number incremented at each detected occlusion), a camera identifier (corresponding to an identifier of the camera wherein the occlusion is detected), an image identifier or index (corresponding to the image where the occlusion is detected or the given moment at which the occlusion is detected) and the occlusion area corresponding to the pixels involved in the occlusion corresponding to the intersection area of the detected occlusion.

Next, a 2D occlusion map is constructed at step 715. A 2D occlusion map is constructed for each overlapping area that is partitioned in overlapping sub-areas to which is assigned an occlusion state. A 2D occlusion map identifies two types of sub-areas of the overlapping areas. A first type is associated with sub-areas wherein an occlusion is viewed by all the cameras or by none of the cameras (the latter case being unusual since a main object of the first exhaustive exploration during the training period is to identify an occlusion for each of the locations of the overlapping area). A second type is associated with the other sub-areas, i.e. the sub-areas wherein an occlusion is viewed by at least one camera but not all the cameras.

Like the 2D map, the coordinates of the points in the 2D occlusion map are preferably expressed by using 2D world coordinates (i.e., coordinates expressed in a reference frame associated with the scene).

For each point of the 2D occlusion map, an occlusion state indicates whether or not an occlusion viewed by a camera is also viewed by its overlapping cameras (camera sharing partially the same FoV with the considered camera). For the sake of illustration, if the occlusion is viewed by all the cameras, the occlusion state is set to a particular value, for example zero. Otherwise, the occlusion state is set to an identifier of an overlapping camera which does not view the occlusion. It is to be noted that if several cameras do not view the occlusion, the camera which identifier is referenced in the occlusion state is advantageously determined as a function of a detection score as described below.

A set of adjacent points of the 2D occlusion map sharing the same occlusion state is referred to as a part of the 2D occlusion map. A part containing points associated with an occlusion state set to a value of a camera identifier is considered assigned. On the contrary, a part containing points associated with an occlusion state not set to a value of a camera identifier is referred to as a non-assigned part.

Construction of 2D occlusion maps is described in more detail by reference to FIG. 9.

As illustrated with reference 720, a second exhaustive exploration of the non-assigned part of the considered overlapping area is then performed during a second phase of the training period.

Only one moving person or moving object is needed to carry out that phase.

During that second phase of the training period, each tracking algorithm of each camera covering the considered overlapping area is used to compute a detection score related to the tracked person or object (step 725). Such detection scores (which are computed by most of the detection modules of the standard tracking algorithms) are stored to be used for constructing a 2D score map.

A detection score values the confidence associated with the detection of a particular target. A person is considered to be probably detected when the detection score reaches a predetermined value.

According to particular embodiments, the detection scores are computed only for the non-assigned parts of the considered occlusion map (corresponding to the considered overlapping area).

Then, a 2D score map is constructed (step 730) for each non-assigned part of the considered occlusion map (i.e. assigned parts are not concerned by step 730).

An identifier of a camera or of a tracking module to be used is assigned to each point of the non-assigned part to indicate the best camera to be used for the tracking algorithms. Construction of 2D score maps is described with more details by reference to FIG. 10.

In a following step, a 2D role map is generated (step 735) as a function of the 2D occlusion map and of the 2D score map.

As mentioned above, a 2D role map is advantageously generated for each overlapping area to establish a relation between an identifier of a camera (or of a tracking module) and a point in the scene.

A 2D role map may be divided into parts, each part corresponding to a set of adjacent points associated with the same camera of tracking module identifier.

The 2D role map is constructed in two steps.

In a first step, based on the 2D occlusion maps generated during step 715, the camera or tracking module identifiers assigned to parts of the 2D occlusion map are duplicated to the corresponding points of the 2D role map.

Then, in a second step, each point of the 2D role map to which no camera or tracking module identifier is assigned inherits the camera or tracking module identifier of the corresponding point in the 2D score map.

Figures 8A, 8B, 8C:
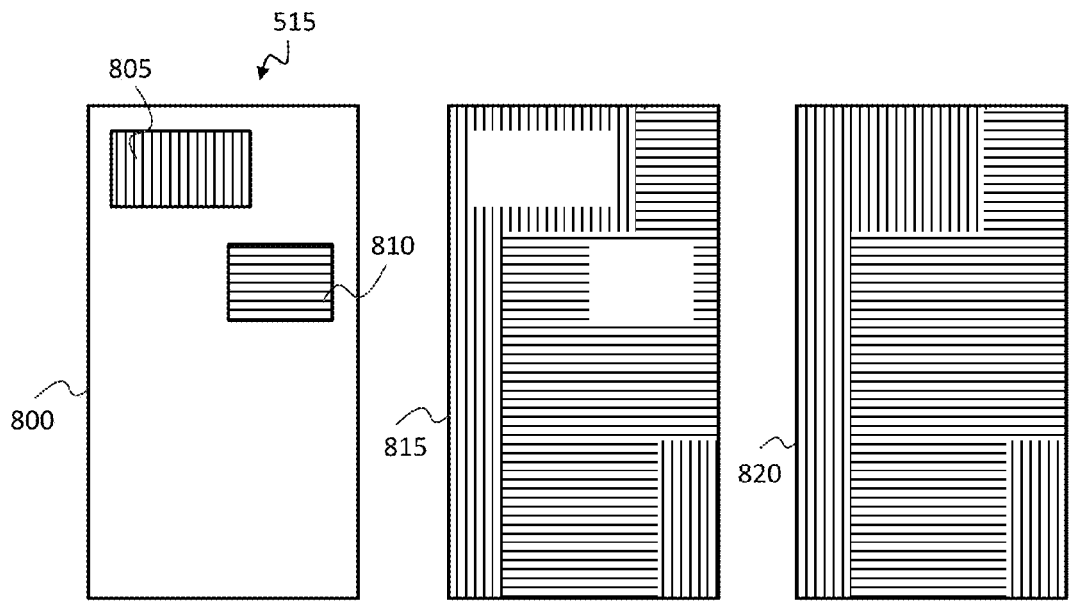
FIGS. 8a, 8b, and 8c, illustrates an example of a 2D occlusion map, a 2D score map, and a 2D role map associated with an overlapping area illustrated in FIG. 5.

FIG. 8, comprising FIGS. 8a, 8b, and 8c, illustrates an example of a 2D occlusion map, a 2D score map, and a 2D role map associated with overlapping area 515 illustrated in FIG. 5.

More precisely, FIG. 8a illustrates occlusion map 800 derived from the overlapping area 515. As illustrated with vertical hatching, area 805 of 2D occlusion map 800 corresponds to an area wherein all the cameras acquiring a sub-image corresponding to overlapping area 515 detect an occlusion except one camera (e.g. camera #1). Likewise, as illustrated with horizontal hatching, area 810 of 2D occlusion map 800 corresponds to an area wherein all the cameras acquiring a sub-image corresponding to overlapping area 515 detect an occlusion except one camera (e.g. camera #2).

FIG. 8b illustrates a 2D score map 815 derived from the overlapping area 515 and the 2D occlusion map 800. As illustrated, a camera or tracking module identifier is assigned to each point of the area corresponding to overlapping area 515 except the points corresponding to an area wherein all the cameras acquiring a sub-image corresponding to overlapping area 515 detect an occlusion except one camera (i.e. areas 805 and 810).

Finally, FIG. 8c illustrates a 2D role map 820 corresponding to the overlapping area 515. It is constructed based on the camera or tracking module identifiers identified in the 2D occlusion map 800 and in the 2D score map 820.

FIG. 9 is a flowchart illustrating steps for generating 2D occlusion maps as described by reference to FIG. 7.

As set forth herein above, a 2D occlusion map is preferably generated for each overlapping area.

A 2D occlusion map identifies whereas an occlusion viewed by a camera is also viewed by all the other cameras of the set of cameras that acquire images comprising representation of the considered overlapping area. More precisely, an occlusion state is determined for each point of a 2D occlusion map to indicate whether or not there is at least one camera that does not view an occlusion viewed by another camera.

If the occlusion is viewed by all the cameras of the set of cameras that acquire images comprising a representation of the considered overlapping area, the occlusion state is preferably set to a predetermined value, for example zero. On the contrary, if the occlusion is not viewed by at least one camera, the occlusion state is set to a value representing an identifier of a camera that does not view the occlusion (or of a tracking module associated with that camera). If several cameras do not view the occlusion, the camera whose identifier is referenced in the occlusion state is advantageously determined as a function of detection scores as described hereafter in reference to FIG. 10.

As illustrated, a first step (step 905) is directed to projecting each pixel of each of the identified occlusion areas (step 710 in FIG. 7) in order to project these pixels of an image acquired by a camera in the 2D map whose point coordinates are expressed in a common reference frame associated with the scene (2D world coordinates).

Next, the occlusion state of all the points of a 2D temporary occlusion map is initialized to a predetermined value (step 910), for example −1. The shape and the size of the 2D temporary occlusion map are the same as the one of the considered overlapping area.

As the algorithm described by reference to FIG. 9 is performed for a set of images and a set of cameras, variables or indexes id_frame and id_probe_cam are used to identify a particular frame and a particular camera of the set of frames and the set of cameras.

The frames of the set of frames are the images obtained during the training period (training_period) by the cameras of the set cameras that acquire images comprising representation of the considered overlapping area.

Likewise, the cameras of the set of cameras correspond to the overlapping cameras involved in the overlapping area (i.e. the cameras of the set cameras that acquire images comprising representation of the considered overlapping area). It is represented by a list of camera identifiers (or of tracking module identifiers) denoted lst_cam.

Variable id_frame is initialized to 1 in order to process all the frames of the set (step 915) and variable id_probe_cam is initialized to 1 in order to process all the overlapping cameras (step 920).

At step 925, the list of occlusions (denoted lst_occlusions) detected by the camera identified with the current value of variable id_probe_cam a) in the frame corresponding to the value of variable id_frame is obtained (these occlusions are identified at step 710 in FIG. 7).

Next, an index associated with the occlusions, denoted id_occlusion_probe, is initialized to the value 1 so as to handle each occlusion independently (step 930), in order to process the list of occlusions (lst_occlusions).

In a following step (step 935), a search is conducted to find occlusions detected simultaneously (i.e. at frame id_frame) as occlusion id_occlusion_probe by another camera (i.e. a camera of the list of cameras lst_cam having an index different than id_probe_cam), if any.

It is to be noted that two occlusions a and b are considered simultaneous if the projected intersection area of the occlusion a (in 2D real world coordinates), referred to as int_area_a, overlaps the projected intersection area of the occlusion b (in 2D real world coordinates), referred to as int_area_b. To avoid false detection, an overlap ratio is preferably computed and compared with a threshold for determining whether the identified simultaneous occlusion is to be considered as a simultaneous occlusion or is to be ignored.

Such an overlap ratio can be computed as being the ratio between the intersection area between the projected areas int_area_a and int_area_b and the area of the smaller projected area. If the value of the computed ratio is higher than a given threshold (for example 50%), a simultaneous detection is detected otherwise, it is ignored.

Since the search conducted at step 935 is preferably exhaustive, current occlusion id_occlusion_probe is compared with all the occlusions detected in the frames id_frame obtained by the cameras of the lst_cam list different from id_probe_cam.

Next, a test is carried out to determine whether or not a whole synchronous occlusion has been detected for occlusion id_occlusion_probe (step 940), i.e. whether or not a synchronous occlusion is detected for all the cameras of the lst_cam list.

If a whole synchronous occlusion is not detected, i.e. if it exists at least one camera for which there is no occlusion, the occlusion state of the points involved in the occlusion id_occlusion_probe is updated, if it is equal to the initialization value (e.g. −1), to an identifier of that camera (or of the tracking module associated with that camera). Again, if several cameras do not view the occlusion, the camera which identifier is referenced in the occlusion state is advantageously determined as a function of detection scores as described hereafter in reference to FIG. 10.

Accordingly, the occlusion state of all the points of the intersection area of id_occlusion_probe projected in 2D world coordinates is updated to that identifier if its value is different than −1.

On the contrary, if a whole synchronous occlusion is detected, i.e. if there is not at least one camera for which there is no occlusion, the occlusion state of the points involved in the occlusion id_occlusion_probe is updated to a predetermined value indicative of a whole synchronous occlusion (step 950, for example 0.

Next, variable id_occlusion_probe is incremented by one in order to analyze the next occlusion of the lst_occlusions list and a test is performed to determine whether or not all the occlusions of that list have been processed (steps 955 and 960).

If all the occlusions of the lst_occlusions list have not been processed, the last five steps (steps 935 to 960) are repeated, i.e. the algorithm is looped to step 935 as illustrated.

On the contrary, if all the occlusions of the lst_occlusions list have been processed, variable id_probe_cam is incremented by one in order to process the occlusions viewed by the next camera of the lst_cam list and a test is performed to determine whether or not all the occlusions of all the cameras of that list have been processed (steps 965 and 970).

If not all the occlusions of all the cameras of that list have been processed, the last ten steps (steps 925 to 970) are repeated, i.e. the algorithm is looped to step 925 as illustrated.

On the contrary, if all the occlusions of all the cameras of the lst_cam list have been processed, variable id_frame is incremented by one in order to process the occlusions detected in the next frame and a test is performed to determine whether or not all the occlusions of all the cameras of all the frames have been processed (steps 975 and 980).

If not all the occlusions of all the cameras of all the frames have been processed, the last thirteen steps (steps 920 to 980) are repeated, i.e. the algorithm is looped to step 920 as illustrated.

On the contrary, if all the occlusions of all the cameras of all the frames have been processed, the 2D occlusion map is created (step 985).

To that end, the occlusion state of each point of the 2D temporary occlusion map is analyzed and the adjacent points having the same occlusion state are grouped in order to generate a part. At the end, several disjoint parts are generated, generating a partition of the overlapping area, referred to as 2D occlusion map.

Figure 10:
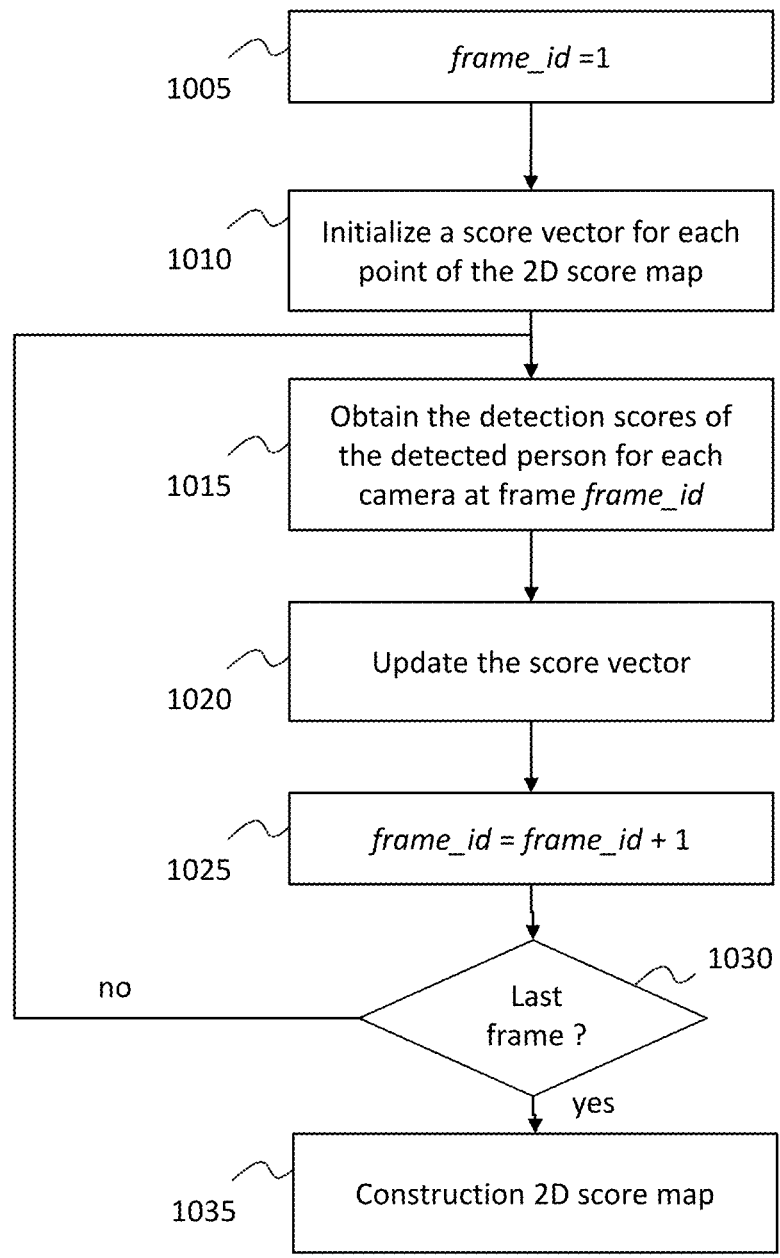
FIG. 10 is a flowchart illustrating steps for generating a 2D score map as described by reference to FIG. 7.

FIG. 10 is a flowchart illustrating steps for generating a 2D score map as described by reference to FIG. 7;

As set forth hereinabove, a 2D score map is preferably generated for each overlapping area. More precisely, a 2D score map is advantageously generated for each overlapping area except for parts corresponding to assigned parts of the corresponding 2D occlusion map (as described by reference to step 715 in FIG. 7).

According to particular embodiments, a camera identifier or a tracking module identifier is associated with each point of the 2D score map to indicate a camera to be used for the tracking algorithms. In the 2D score map, a part designates a set of adjacent points with which is associated the same identifier.

Since the algorithm described by reference to FIG. 10 is performed on a frame basis, an index (or a variable), denoted frame_id, representing a frame in a list of frames is defined. It is initialized to a predetermined value, for example 1, at step 1005.

A score vector is determined for each point of the 2D score map. Its dimension is equal to the number of cameras involved in the considered overlapping area (i.e. the number of overlapping cameras). Each component of each score vector is initialized to a predetermined value, for example zero, at step 1010.

Next, in a following step, the detection scores of the detected person or object, for each overlapping camera, at frame_id frame, as determined at step 725 in FIG. 7, are obtained (step 1015).

As mentioned above, only one person or object is moving in the scene for carrying out the steps of constructing the 2D score maps. Accordingly, there is at best one detected person or object. If the person is not detected by a camera, the detection score is set to zero.

Next, the score vector associated with the points corresponding to the detection is updated based on the detection score of the detected person or object for each camera (step 1020). To that end, the detection score having the highest value is determined in order to identify the corresponding camera which is denoted asid_cam and the corresponding bounding box which is denoted id_bbox. Then, the score vectors associated with the points of the 2D score map corresponding to the projection of the id_bbox bounding box are selected and their components corresponding to the asid_cam camera are incremented by one.

In a following step, frame_id variable is incremented by one so as to analyse all the frames and a test is performed to determine whether or not all the frames have been processed (steps 1025 and 1030).

If not all the frames have been processed, the last four steps (steps 1015 to 1030) are repeated, i.e. the algorithm is branched to step 1015 as illustrated.

On the contrary, if all the frames have been processed, the 2D score map is constructed (step 1035). To that end, each of the score vectors is selected so as to identify one camera identifier or tracking module identifier that is the camera identifier or tracking module identifier corresponding to the component of the considered score vector having the highest value.

Then, the identifier associated with each point is analyzed in order to group adjacent points having the same identifier in order to generate parts. Therefore, several disjoint parts are generated, resulting in a partition of the considered overlapping area, referred to as 2D score map.

It is to be noted that the 2D occlusion map and the 2D score map associated with the same overlapping area can be the same 2D map. In such a case, after the 2D occlusion map is constructed, it is updated during the construction of the 2D score map. Therefore, the obtained 2D score map corresponds to the 2D role map.

It is to be noted that any step of the algorithm described by reference to FIGS. 7, 9, and 10 may be implemented in software by execution of a set of instructions or program by a programmable computing machine, such as a PC ("Personal Computer"), a DSP ("Digital Signal Processor") or a microcontroller; or else implemented in hardware by a machine or a dedicated component, such as an FPGA ("Field-Programmable Gate Array") or an ASIC ("Application-Specific Integrated Circuit").

Figure 11:
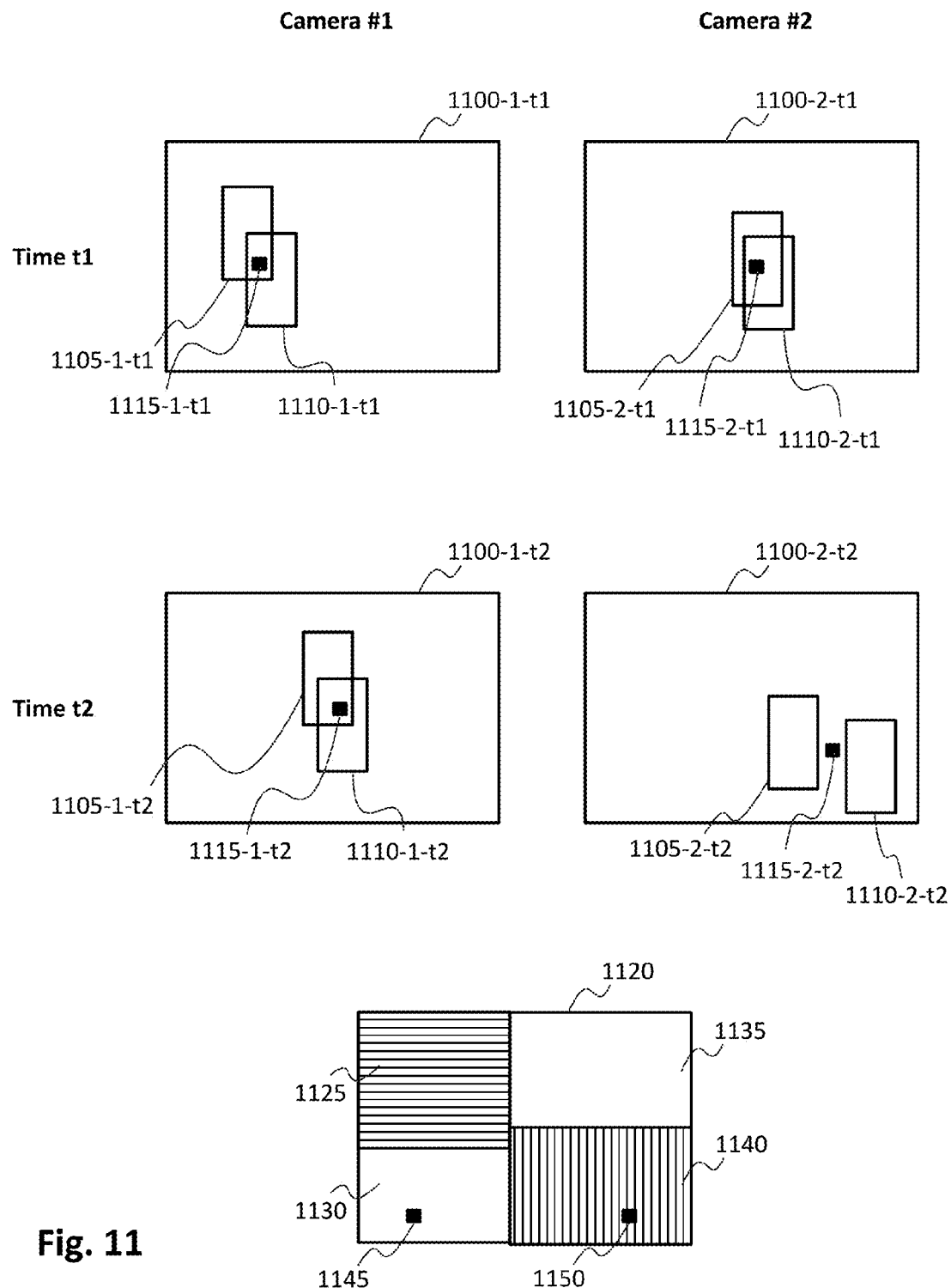
FIG. 11 illustrates an example of sub-images analysis leading to the construction of a 2D occlusion map according to embodiments of the disclosure.

FIG. 11 illustrates an example of sub-images analysis leading to the construction of a 2D occlusion map according to embodiments of the disclosure.

Four sub-images are illustrated. They represent sub-images acquired by two cameras (camera #1 and camera #2) at two consecutive points in time (t1 and t2) of a first phase of a training period: sub-image 1100-1-*t*1 is acquired by camera #1 at time t1, sub-image 1100-2-*t*1 is acquired by camera #2 at time t1, sub-image 1100-1-*t*2 is acquired by camera #1 at time t2, and sub-image 1100-2-*t*2 is acquired by camera #2 at time t2.

They correspond, for example, to the overlapping area 410-12 illustrated in FIG. 4.

Two persons or objects are detected on each sub-image. Each of the detected persons/objects is represented by a bounding box.

For example, a first detected person/object is represented by bounding box 1105-1-*t*1 and a second detected person/object is represented by bounding box 1110-1-*t*1 in sub-image 1100-1-*t*1. Likewise, the first and the second detected persons/objects are represented by bounding boxes 1105-2-*t*1 and 1110-2-*t*1 in sub-image 1100-2-*t*1. Similarly, the first and the second detected persons/objects are represented by bounding boxes 1105-1-*t*2 and 1110-1-*t*2 in sub-image 1100-1-*t*2 and the first and the second detected persons/objects are represented by bounding boxes 1105-2-*t*2 and 1110-2-*t*2 in sub-image 1100-2-*t*2.

These bounding boxes are determined at step 710 in FIG. 7.

Since bounding boxes 1105-1-*t*1 and 1110-1-*t*1 overlap (and on the assumption that the overlapping ratio exceeds a predetermined ratio), an occlusion is detected in sub-image 1100-1-*t*1. This occlusion corresponds to the intersection of bounding boxes 1105-1-*t*1 and 1110-1-*t*1.

Likewise, an occlusion is detected in sub-images 110-2-*t*1 and 1100-1-*t*2.

However, no occlusion is detected in sub-image 1100-2-*t*2 since bounding boxes 1105-2-*t*2 and 1110-2-*t*2 does not overlap.

2D occlusion map 1120 corresponds to the projection of sub-images 1100-1-*t*1, 1100-2-*t*1, 1100-1-*t*2 and 1100-2-*t*2 (the projection of these sub-images providing the same area in the 2D map).

To construct 2D occlusion map 1120, each detected occlusion is considered after having set all the value of its points to a predetermined value, e.g. −1.

For the sake of illustration, it is considered that the projection of the intersection of bounding boxes 1105-1-*t*1 and 1110-1-*t*1 matches the projection of the intersection of bounding boxes 1105-2-*t*1 and 1110-2-*t*1. More precisely, it is considered that projection of pixel 1115-1-*t*1 and of pixel 1115-2-*t*1 corresponds to point 1145 of 2D occlusion map 1120.

Likewise, it is considered that the projection of the intersection of bounding boxes 1105-1-*t*2 and 1110-1-*t*2 matches the projection of the intersection of bounding boxes 1105-2-*t*2 and 1110-2-*t*2 (but does not match the intersection of bounding boxes 1105-1-*t*1 and 1110-1-*t*1). It is considered that projection of pixel 1115-1-*t*2 and of pixel 1115-2-*t*2 corresponds to point 1150 of 2D occlusion map 1120.

When all the detected occlusions have been analysed, it is determined that the occlusion resulting from the overlap of bounding boxes 1105-1-*t*1 and 1110-1-*t*1 is a whole synchronous occlusion (i.e. an occlusion that is viewed by all the cameras). Accordingly, the occlusion status corresponding to the projection of this occlusion part is set to a predetermined value, for example 0, that indicates that a camera identifier or a tracking module identifier should be determined using a score map. This part is illustrated by reference 1145 in FIG. 11.

It is determined (when all the detected occlusions have been analysed) that the occlusion resulting from the overlap of bounding boxes 1105-1-*t*2 and 1110-1-*t*2 is not a whole synchronous occlusion (i.e. is not an occlusion that is viewed by all the cameras). Indeed, this occlusion is not viewed by camera #2. Accordingly, the occlusion status corresponding to the projection of this occlusion part is set to an identifier of camera #2 or to an identifier of a tracking module associated with this camera. This part is illustrated by reference 1150 in FIG. 11.

As illustrated, 2D occlusion map 1120 is divided in four parts 1125, 1130, 1135, and 1140. Parts 1130 and 1135 correspond to adjacent points having all an occlusion state 0. This means that an occlusion observed in a FoV of one of the cameras is also observed in the FoV of the other cameras (of the set of overlapping cameras).

Part 1125 corresponds to adjacent points having all an occlusion state equal to the identifier of the same camera and part 1140 corresponds to adjacent points having all an occlusion state equal to the identifier of another camera.

Once 2D occlusion maps 1120 has been constructed, step 720 in FIG. 7 performs an exhaustive exploration of the non-assigned parts 1130 and 1135 to construct a 2D score map so as to construct a 2D role map.

Figure 12:
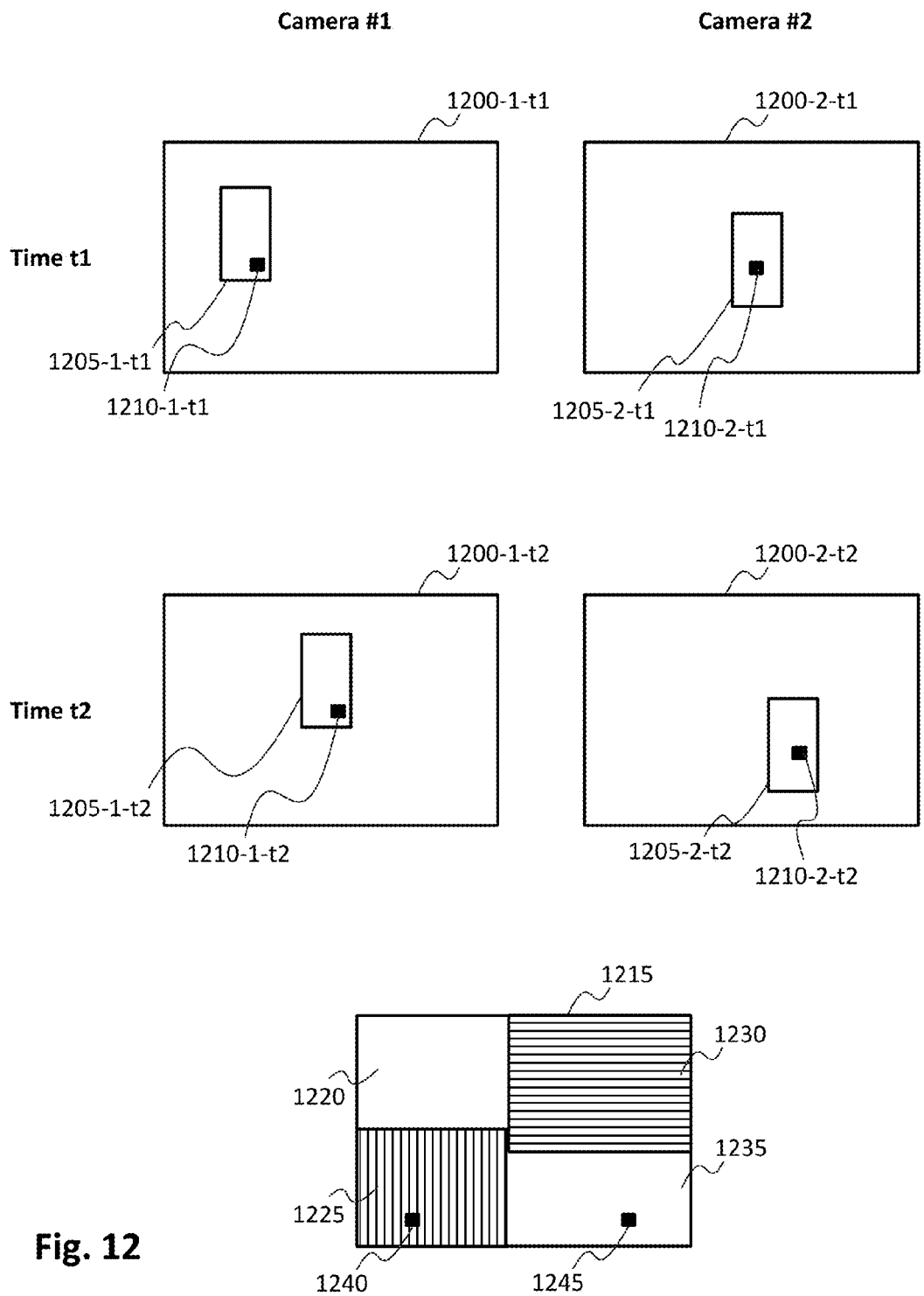
FIG. 12 illustrates an example of sub-images analysis leading to the construction of a 2D score map according to embodiments of the disclosure.

FIG. 12 illustrates an example of sub-images analysis leading to the construction of a 2D score map according to embodiments of the disclosure.

Four sub-images are illustrated. They represent sub-images acquired by two cameras (camera #1 and camera #2) at two consecutive points in time (t1 and t2) of a second phase of a training period (for example the second phase that follows the first one described by reference to FIG. 11): sub-image 1200-1-*t*1 is acquired by camera #1 at time t1, sub-image 1200-241 is acquired by camera #2 at time t1, sub-image 1200-1-*t*2 is acquired by camera #1 at time t2, and sub-image 1200-2-*t*2 is acquired by camera #2 at time t2.

They correspond, for example, to the overlapping area 410-12 illustrated in FIG. 4.

One person or one object is detected on each sub-image. The detected person/object is represented by a bounding box.

For example, a detected person/object is represented by bounding box 1205-1-*t*1 in sub-image 1200-1-*t*1. Likewise, the detected person/object is represented by bounding box 1205-2-*t*1 in sub-image 1200-2-*t*1. Similarly, the detected person/object is represented by bounding box 1205-1-*t*2 in sub-image 1200-1-*t*2 and the detected person/object is represented by bounding box 1205-2-*t*2 in sub-image 1200-2-*t*2.

These bounding boxes are determined at step 725 in FIG. 7.

Looking at 2D occlusion map 1120 in FIG. 11, the aim of the score map is to identify camera or tracking module for the points of areas 1130 and 1135. No new partition of the overlapping area associated with 2D occlusion map 1120 is to be done.

Therefore, 2D score map 1215 derives from 2D occlusion map 1120 and thus only parts 1225 and 1230, corresponding to parts 1130 and 1135 of FIG. 11, have to be analysed.

For the sake of illustration, it is considered that projection of pixel 1210-1-$t1$ belonging to bounding box 1205-1-$t1$ (where the tracked person/object has been detected) and of pixel 1210-2-$t1$ belonging to bounding box 1205-2-$t1$ (where the tracked person/object has been detected) corresponds to point 1140 in 2D score map 1215.

By comparing the detection score associated with pixel 1210-1-$t1$ with the detection score associated with pixel 1210-241, it is possible to determine which of the cameras among the cameras that acquire the sub-images to which belong these pixels provides the best result. For example, if the detection score associated with pixel 1210-1-$t1$ is greater than the detection score associated with pixel 1210-2-$t1$, the score value of pixel 1140 is set to the value identifier of camera #1.

Likewise, it is considered that projection of pixel 1210-1-$t2$ belonging to bounding box 1205-1-$t2$ (where the tracked person/object has been detected) and of pixel 1210-2-$t2$ belonging to bounding box 1205-2-$t2$ (where the tracked person/object has been detected) corresponds to point 1145 in 2D score map 1215.

Again, by comparing the detection score associated with pixel 1210-1-$t2$ with the detection score associated with pixel 1210-2-$t2$, it is possible to determine which of the cameras among the cameras that acquire the sub-images to which belong these pixels provides the best result. For example, if the detection score associated with pixel 1210-1-$t2$ is smaller than the detection score associated with pixel 1210-2-$t2$, the score value of pixel 1145 is set to the value identifier of camera #2.

Therefore, by comparing the detection scores associated with pixels corresponding to the pixels of the 2D score map, it is possible to assign an identifier of a camera or of a tracking module to each pixel of the 2D score map.

As illustrated, 2D score map 1215 is divided into four parts 1220, 1225, 1230, and 1235. Since an identifier of a camera or of a tracking module has been assigned to each pixel of parts 1220 and 1235 in the 2D occlusion map, these parts are not taken into account when constructing the 2D score map.

Part 1225 corresponds to adjacent points to which is assigned the identifier of the same camera and part 1140 corresponds to adjacent points to which is assigned the identifier of another camera.

Figure 13:
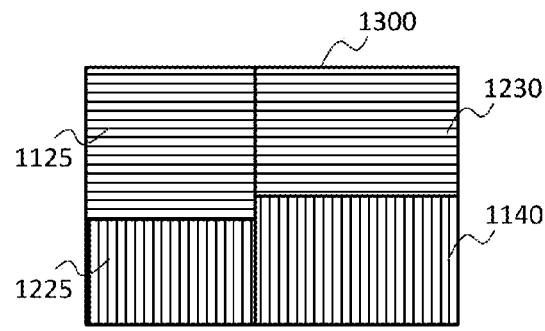
FIG. 13 illustrates a 2D role map obtained from the 2D occlusion map illustrated in FIG. 11 and the 2D score map illustrated in FIG. 12.

Merging 2D occlusion map 1120 and 2D score map 1215 leads to a 2D role map, for example 2D role map 1300 illustrated in FIG. 13.

According to particular embodiments, part 1125 of 2D occlusion map 1120 and part 1230 of 2D score map 1215 can be merged (the same identifier is associated with all the points of these parts). Likewise, part 1140 of 2D occlusion map 1120 and part 1225 of 2D score map 1215 can be merged.

Figure 14:
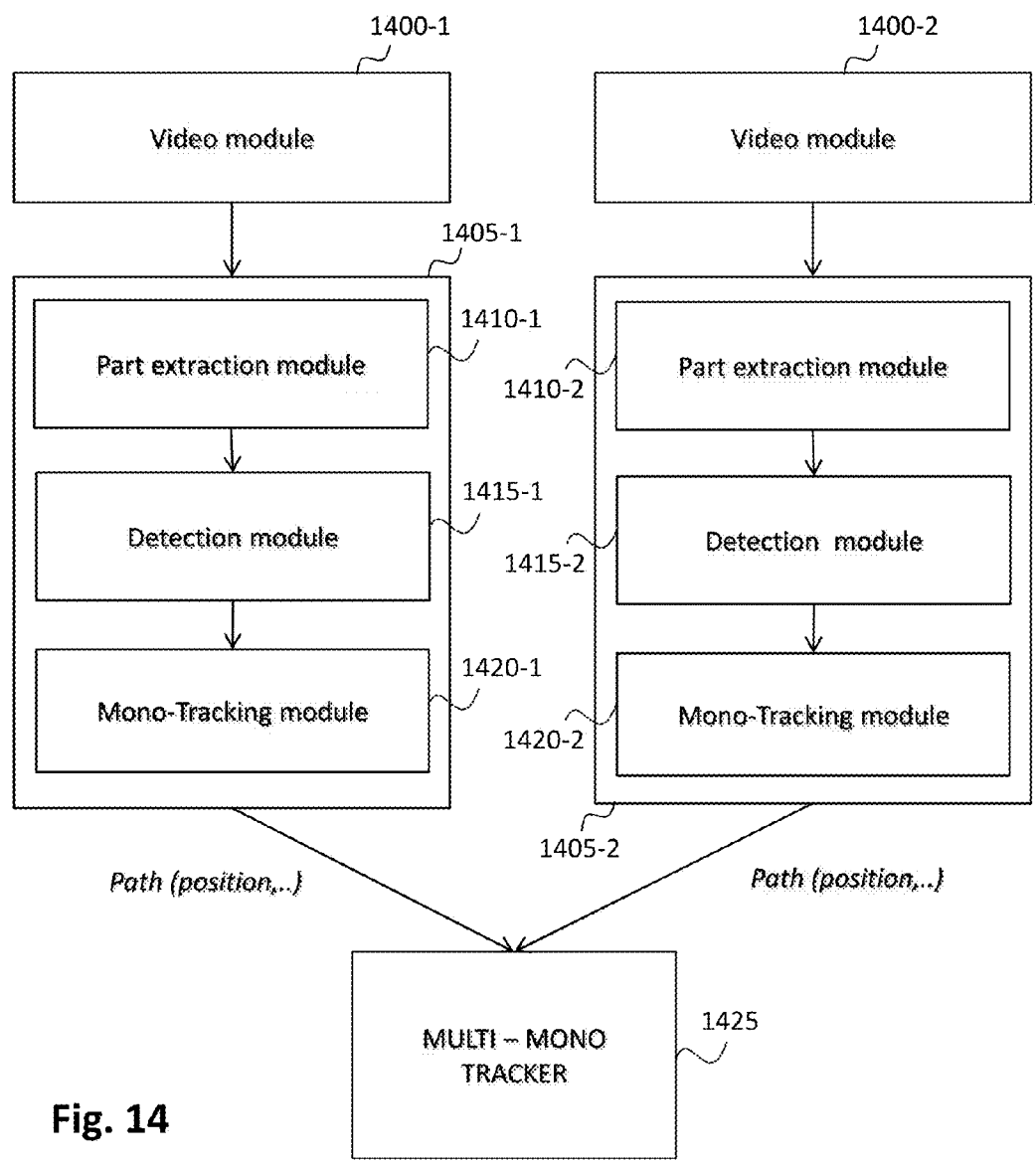
FIG. 14 is a schematic block diagram of a multi-tracker fusion system enabling the combining of data processed by mono-camera trackers according to particular embodiments of the disclosure.

FIG. 14 is a schematic block diagram of a multi-tracker fusion system enabling the combining of data processed by mono-camera trackers according to particular embodiments of the disclosure.

The schematic block diagram illustrated in FIG. 14 is based on the schematic block diagram illustrated in FIG. 6 and comprises a part extraction module associated with each video source (e.g. each camera).

Again, for the sake of illustration, the video-surveillance system comprises two cameras. However, it should be understood that the system may comprise more than two cameras.

As illustrated, a module comprising a part extraction module, a detector module and a mono-tracker module is associated with a video module. For example, module 1405-1 comprising part extraction module 1410-1, detection module 1415-1, and mono-camera tracking module 1420-1 is associated with video module 1400-1 and module 1405-2 comprising part extraction module 1410-2, detection module 1415-2, and mono-camera tracking module 1420-2 is associated with video module 1400-2.

A main object of video modules 1400-1 and 1400-2 is to receive sequences of images (or videos) that are typically provided by a local video sensor or by a remote device.

According to particular embodiments, video modules 1400-1 and 1400-2 are embedded within cameras along with modules 1405-1 and 1405-2 (video module 1400-1 and module 1405-1 being embedded in a first camera and video module 1400-2 and module 1405-2 being embedded in a second camera). Alternatively, video modules 1400-1 and 1400-2 as well modules 1405-1 and 1405-2 belong to a remote device, typically a remote server.

According to the given example, modules 1405-1 and 1405-2 are tracking modules based on a tracking-by-detection algorithm. Each of these modules comprises a standard detection module (1415-1 and 1415-2) and a standard mono-camera tracking module (1420-1 and 1420-2). They are similar to the detection module (610-1 and 610-2) and the mono-camera tracking module (615-1 and 615-2) described by reference to FIG. 6.

Part extraction modules 1410-1 and 1410-2 (generically referenced 1410) are directed to determining which part of a current frame needs to be analysed. To that end, these modules use a 2D role map, typically a 2D role map constructed according to a method similar to the one described by reference to FIG. 7 during a training period.

As described above, a 2D role map is a 2D map comprising parts, each points of a part being associated with the same identifier of camera or of tracking module.

Based on such a 2D role map, module 1410 extracts the one or several parts of the images to be processed for tracking one or several objects. The extracted parts are the parts associated with the camera or the tracking module, i.e., the parts whose points are associated with an identifier that corresponds to the one of the considered camera or of the considered tracking module. Only these extracted parts are sent to the corresponding detector module. Accordingly, the amount of data to be processed by the latter is greatly reduced.

For illustrative purposes, it is assumed that modules 1400-1 and 1405-1 correspond to camera #1 and that modules 1400-2 and 1405-2 correspond to camera #2. During the training period, the 2D role map 1300 is generated.

In operation, for each new frame, module 1410-1 extracts the projection of parts 1125 and 1230 of the current frame (from 2D world coordinates to pixel coordinates) acquired through video module 1400-1 and module 1410-2 extracts the projection of parts 1225 and 1140 of the current frame acquired through video module 1400-2.

Then, modules 1415-1, 1420-1, 1415-2, and 1420-2 operate on a standard basis as described by reference to FIG. 6 and the results are transmitted to module 1425 that may be similar to module 620 described by reference to FIG. 6.

According to particular embodiment, multi-mono tracking module 1425 is simplified in order to simply select a result from a mono-tracking module. Indeed, since a target is tracked with a single tracking module, there is no need for a fusion step.

Figure 15:
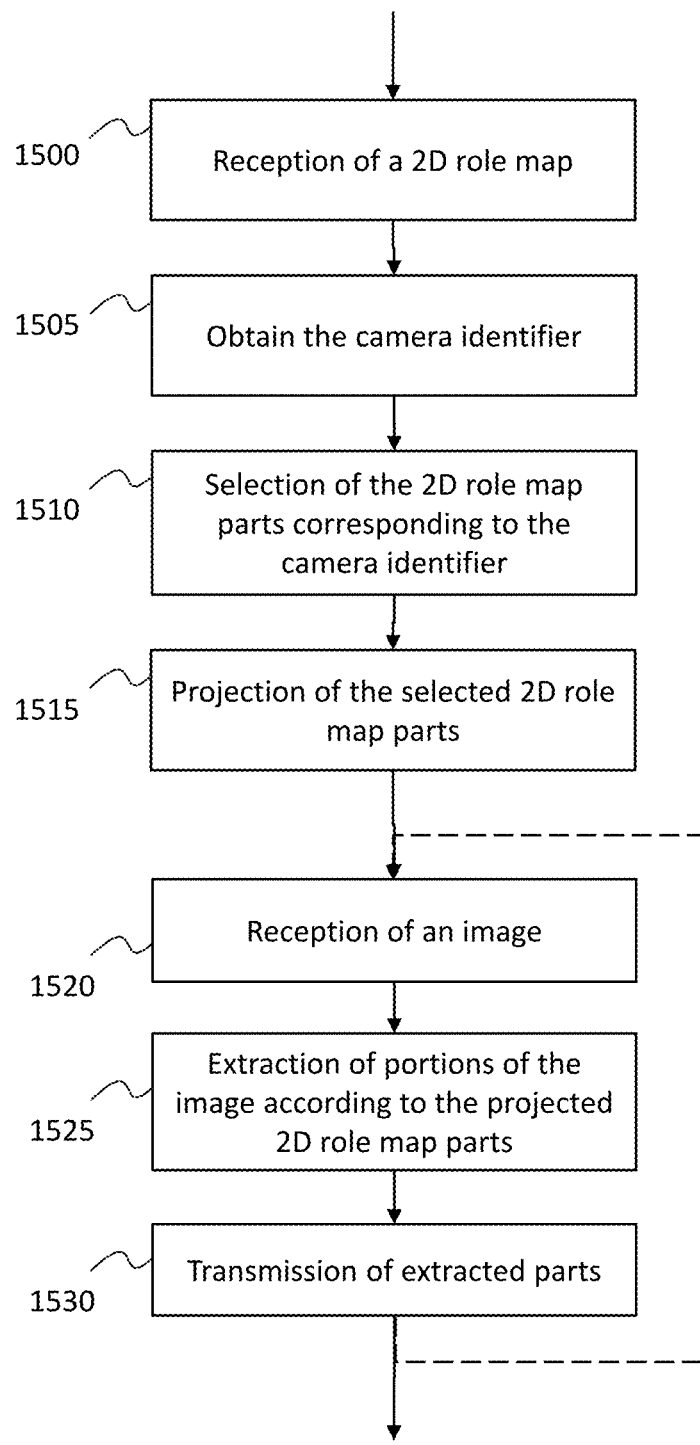
FIG. 15 is a flowchart illustrating steps of a method for extracting parts of an image according to a 2D role map.

FIG. 15 is a flowchart illustrating steps of a method for extracting parts of an image according to a 2D role map.

Steps illustrated in FIG. 15 are typically carried out by part extraction module 1410 described by reference to FIG. 14.

First steps aim at obtaining a 2D role map (step 1500) that is preferably the same for all the camera and tracking modules and at obtaining an identifier of the considered camera or of the considered tracking module (step 1505).

Next, parts of the 2D role maps are selected as a function of the obtained identifier of the camera or of the tracking module (step 1510). In other words, each part of the 2D role map that is associated with the identifier of the camera or of the tracking module is selected.

The selected parts of the 2D role map (that are defined in a reference frame associated with the real scene) are projected in a reference frame associated with the images acquired by the considered camera (step 1515).

It is to be noted that steps 1500 to 1515 are carried out only once after the considered camera or tracking module has been turned on or initialized.

In a following step, an image is received from a video source (step 1520), typically a video sensor.

Next, the portions of the received images corresponding to the projected parts of the selected parts of the 2D role map are extracted (step 1525) and transmitted to be processed (step 1530), that is to say to track one or several persons and/or objects.

Although the present disclosure has been described hereinabove with reference to specific embodiments, the present disclosure is not limited to the specific embodiments, and modifications which lie within the scope of the present disclosure will be apparent to a person skilled in the art. Many further modifications and variations will suggest themselves to those versed in the art upon making reference to the foregoing illustrative embodiments, which are given by way of example only and which are not intended to limit the scope of the invention as determined by the appended claims. In particular different features from different embodiments may be interchanged, where appropriate.

The invention claimed is:

1. A method for optimizing processing of at least two images obtained from at least two sources of images, a sub-image of each of the at least two images representing an overlapping area of a real scene, the method comprising:
generating a two-dimensional (2D) map representing the overlapping area of the real scene;
partitioning the overlapping area of the generated 2D map into a plurality of sub-areas as a function of an occlusion criterion determined for points of the overlapping area;
associating an identifier of a source of images with points of the generated 2D map, the associating step being based on the occlusion criterion or on a detection score depending on the sub-areas; and
generating a 2D role map based on the generated 2D map and on the associated identifiers, the 2D role map comprising a plurality of parts, all the points of each part of the 2D role map being associated with a single identifier of a source of images so that only one of the at least two sources of images is to be selected to process a representation of a portion of the overlapping area.

2. The method of claim 1, wherein an identifier of a considered source of images is associated with a considered point of a sub-area of the overlapping area if no occlusion is detected for the considered point in an image obtained from the considered source of images.

3. The method of claim 1, wherein an identifier of a source of images is associated with:
a considered point of a sub-area of the overlapping area as a function of a detection score criterion associated with each source of images of a set of sources of images if no occlusion is detected for the considered point in an image obtained from each source of images of the set of sources of images; or
a considered point of a sub-area of the overlapping area as a function of a detection score criterion if an occlusion is detected for the considered point in an image obtained from each of the sources of images providing images comprising a sub-image representing the overlapping area of the real scene.

4. The method of claim 1, further comprising preliminary steps of determining occlusion criterions, an occlusion criterion being associated with a point of the overlapping area and with a source of images.

5. The method of claim 4, wherein a preliminary step of determining an occlusion criterion is carried out for each point of the overlapping area.

6. The method of claim 1, further comprising a step of computing detection scores, a detection score being associated with a point of the overlapping area and with a source of images.

7. The method of claim 1, further comprising:
selecting parts of the 2D role map as a function of an identifier of the considered source of images; and
processing sub-images of an image obtained by the considered source of images, the processed sub-images corresponding to the selected parts of the 2D role map.

8. The method of claim 7, further comprising:
a step of projecting the selected parts of the 2D role map into a reference frame associated with the images obtained by the considered source of images; and
a step of extracting the sub-images to be processed, the extracted sub-images corresponding to the projected parts of the 2D role map.

9. A non-transitory computer-readable storage medium storing instructions of a computer program for causing a computer to implement the method according to claim 1.

10. A device for optimizing processing of at least two images obtained from at least two sources of images, a sub-image of each of the at least two images representing an overlapping area of a real scene, the device comprising a processor configured for carrying out the steps of:
generating a two-dimensional (2D) map representing the overlapping area of the real scene;
partitioning the overlapping area of the generated 2D map into a plurality of sub-areas as a function of an occlusion criterion determined for each point of the overlapping area;
associating an identifier of a source of images with each point of the generated 2D map, the associating step being based on the occlusion criterion or on a detection score depending on the sub-areas; and
generating a 2D role map based on the generated 2D map and on the associated identifiers, the 2D role map comprising a plurality of parts, all the points of each part of the 2D role map being associated with a single identifier of a source of images so that only one of the at least two sources of images is to be selected to process a representation of a portion of the overlapping area.

11. The device of claim 10, wherein the processor is further configured so that an identifier of a considered source of images is associated with:

a considered point of a sub-area of the overlapping area if no occlusion is detected for the considered point in an image obtained from the considered source of images; or a considered point of a sub-area of the overlapping area as a function of a detection score criterion associated with each source of images of a set of sources of images if no occlusion is detected for the considered point in an image obtained from each source of images of the set of sources of images.

12. The device of claim 10, wherein the processor is further configured so that an identifier of a source of images is associated with a considered point of a sub-area of the overlapping area as a function of a detection score criterion if an occlusion is detected for the considered point in an image obtained from each of the sources of images providing images comprising a sub-image representing the overlapping area of the real scene.

13. The device of claim 10, wherein the processor is further configured to carry out preliminary steps of determining occlusion criterions, an occlusion criterion being associated with a point of the overlapping area and with a source of images.

14. The device of claim 13, wherein the processor is further configured so that a preliminary step of determining an occlusion criterion is carried out for each point of the overlapping area.

15. The device of claim 10, wherein the processor is further configured to carry out a step of computing detection scores, a detection score being associated with a point of the overlapping area and with a source of images.

16. The device of claim 10, wherein the processor is further configured for carrying out the steps of:

selecting parts of the 2D role map as a function of an identifier of the considered source of images; and processing sub-images of an image obtained by the considered source of images, the processed sub-images corresponding to the selected parts of the 2D role map.

17. The device of claim 16, wherein the processor is further configured to carry out a step of projecting the selected parts of the 2D role map into a reference frame associated with the images obtained by the considered source of images.

18. The device of claim 17, wherein the processor is further configured to carry out a step of extracting the sub-images to be processed, the extracted sub-images corresponding to the projected parts of the 2D role map.

19. A method for optimizing processing of at least two images obtained from at least two cameras, the method comprising:

generating an overlapping area of a real scene among at least two cameras;

determining an occlusion criterion in the overlapping area;

generating a two-dimensional (2D) occlusion map based on the occlusion criterion; and generating a 2D role map based on the generated 2D occlusion map so that one of the at least two cameras is to be selected to process a representation of a portion of the overlapping area.

20. A device for optimizing processing of at least two images obtained from at least two cameras, the device comprising a processor configured for carrying out the steps of:

generating an overlapping area of a real scene among at least two cameras;

determining an occlusion criterion in the overlapping area;

generating a two-dimensional (2D) occlusion map based on the occlusion criterion; and generating a 2D role map based on the generated 2D occlusion map so that one of the at least two cameras is to be selected to process a representation of a portion of the overlapping area.

\* \* \* \* \*